US011044391B2

(12) United States Patent
Lin et al.

(10) Patent No.: US 11,044,391 B2
(45) Date of Patent: Jun. 22, 2021

(54) ELECTRONIC DEVICE HAVING SLIDING MECHANISM

(71) Applicant: GUANGDONG OPPO MOBILE TELECOMMUNICATIONS CORP., LTD., Guangdong (CN)

(72) Inventors: Zhisheng Lin, Guangdong (CN); Binbin Yan, Guangdong (CN); Jingming Wan, Guangdong (CN); Heng Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/697,046

(22) Filed: Nov. 26, 2019

(65) Prior Publication Data

US 2020/0186687 A1 Jun. 11, 2020

(30) Foreign Application Priority Data

Dec. 10, 2018 (CN) ......................... 201811504207.7

(51) Int. Cl.
*H04N 5/225* (2006.01)
*H04M 1/02* (2006.01)

(52) U.S. Cl.
CPC ........ *H04N 5/2257* (2013.01); *H04M 1/0264* (2013.01); *H04N 5/2252* (2013.01); *H04N 5/2253* (2013.01)

(58) Field of Classification Search
CPC .. H04N 5/2257; H04N 5/2252; H04N 5/2253; H04N 5/2251; H04M 1/0264; H04M 2250/20
See application file for complete search history.

(56) References Cited

U.S. PATENT DOCUMENTS

| | | |
|---|---|---|
| 9,565,279 B2 | 2/2017 | Daniell et al. |
| 2005/0168628 A1 | 8/2005 | Wang et al. |
| 2009/0256955 A1 | 10/2009 | Kuo et al. |

(Continued)

FOREIGN PATENT DOCUMENTS

| | | |
|---|---|---|
| CN | 102448270 A | 5/2012 |
| CN | 103546688 A | 1/2014 |

(Continued)

OTHER PUBLICATIONS

International search report, PCT/CN2019/108538 dated Dec. 30, 2019 (4 pages).

(Continued)

*Primary Examiner* — Antoinette T Spinks

(57) ABSTRACT

An electronic device includes a body, a functional assembly, and a sliding mechanism. The body may define a receiving cavity. The functional assembly may be rotatably connected to the body. The sliding mechanism may be received inside the body. The sliding mechanism may include a sliding rail arranged on one of the body and the functional assembly, and a sliding element arranged on the other of the body and the functional assembly. The sliding element may be slidable along the sliding rail, such that the functional assembly is able to rotate from an inside of the receiving cavity to an outside of the receiving cavity or rotate from the outside of the receiving cavity to the inside of the receiving cavity.

20 Claims, 30 Drawing Sheets

(56) References Cited

U.S. PATENT DOCUMENTS

| | | | | |
|---|---|---|---|---|
| 2011/0117958 | A1 | 5/2011 | Kim et al. | |
| 2018/0011519 | A1 | 1/2018 | Tang et al. | |
| 2018/0295288 | A1* | 10/2018 | Park | H04N 5/23293 |
| 2020/0274958 | A1* | 8/2020 | Gong | G06F 1/1686 |
| 2021/0003908 | A1* | 1/2021 | Liang | G03B 17/17 |

FOREIGN PATENT DOCUMENTS

| | | | |
|---|---|---|---|
| CN | 105208149 | A | 12/2015 |
| CN | 106713549 | A | 5/2017 |
| CN | 106790826 | A | 5/2017 |
| CN | 106790833 | A | 5/2017 |
| CN | 102448270 | B | 6/2017 |
| CN | 106817450 | A | 6/2017 |
| CN | 106856516 | A | 6/2017 |
| CN | 107071242 | A | 8/2017 |
| CN | 206413083 | U | 8/2017 |
| CN | 206422833 | U | 8/2017 |
| CN | 107222594 | A | 9/2017 |
| CN | 207011146 | U | 2/2018 |
| CN | 207039674 | U | 2/2018 |
| CN | 108111715 | A | 6/2018 |
| CN | 108111730 | A | 6/2018 |
| CN | 108124052 | A | 6/2018 |
| CN | 207491002 | U | 6/2018 |
| CN | 207491003 | U | 6/2018 |
| CN | 207491004 | U | 6/2018 |
| CN | 207491006 | U | 6/2018 |
| CN | 207526979 | U | 6/2018 |
| CN | 207782885 | U | 8/2018 |
| CN | 207782888 | U | 8/2018 |
| CN | 207782978 | U | 8/2018 |
| CN | 208015778 | U | 10/2018 |
| CN | 108811416 | A | 11/2018 |
| CN | 108848227 | A | 11/2018 |
| CN | 208079144 | U | 11/2018 |
| CN | 208079151 | U | 11/2018 |
| CN | 208094612 | U | 11/2018 |
| CN | 208128309 | U | 11/2018 |
| CN | 208158640 | U | 11/2018 |
| CN | 208158641 | U | 11/2018 |
| CN | 208433993 | U | 1/2019 |
| CN | 110049215 | A | 7/2019 |
| EP | 1727356 | A2 | 11/2006 |
| EP | 1727356 | A3 | 6/2008 |
| EP | 1429531 | B1 | 7/2009 |
| IN | 201914048325 | A | 6/2020 |
| KR | 1020050068963 | A | 7/2005 |
| KR | 20180076108 | A | 7/2018 |
| TW | 201141183 | A | 11/2011 |
| TW | I502949 | B | 10/2015 |
| WO | 2016011620 | A1 | 1/2016 |

OTHER PUBLICATIONS

International search report, PCT/CN2019/107318 dated Dec. 20, 2019 (4 pages).

European search report, EP19205254, dated Jul. 1, 2020 (8 pages).

First Office Action from China patent office in a counterpart Chinese patent Application 201811504207.7, dated Sep. 2, 2020 (36 pages).

European search report, EP19205254, dated Mar. 12, 2020 (7 pages).

European examination report of EP Application 19201150 dated Oct. 29, 2020. (6 pages).

First Office Action with English Translation from China patent office in a counterpart Chinese patent Application 201811504198.1, dated Sep. 16, 2020, (32 pages).

Second Office Action from China patent office in a counterpart Chinese patent Application 201811504207.7, dated Jan. 8, 2021 (29 pages).

Second Office Action from China patent office in a counterpart Chinese patent Application 201811504198.1, dated Mar. 3, 2021 (29 pages).

Indian First Examination Report, Application No. 201914048325 dated Mar. 3, 2021 (5 pages).

Indian First Examination Report Application 201914048501 dated Apr. 27, 2021 (5 pages).

* cited by examiner

ELECTRONIC DEVICE HAVING SLIDING MECHANISM

CROSS-REFERENCE TO RELATED APPLICATION(S)

This application claims priority to Chinese Patent Application No. 201811504207.7, filed on Dec. 10, 2018, the content of which is herein incorporated by reference in its entirety.

TECHNICAL FIELD

The present disclosure relates to the field of intelligent devices, and in particular to an electronic device.

BACKGROUND

An electronic device, such as a mobile phone and the like, may display information to a user through a display screen. In the related art, a front face of the electronic device may usually define a non-display region, in order to arrange functional components, such as a receiver, a camera, a flash, and the like. In this way, an occupation ratio of a display region is reduced, and user experience is also reduced.

SUMMARY

According to an aspect of the present disclosure, an electronic device may be provided to include a body, a functional assembly, and a sliding mechanism. The body may define a receiving cavity. The functional assembly may be rotatably connected to the body. The sliding mechanism may be arranged in the body and include a sliding rail, arranged on one of the body and the functional assembly, and a sliding element arranged on the other of the body and the functional assembly and slidable along the sliding rail. In this way, the functional assembly is able to rotate from an inside of the receiving cavity to an outside of the receiving cavity or rotate from the outside of the receiving cavity to the inside of the receiving cavity.

According to another aspect of the present disclosure, an electronic device may be provided to include a body, a functional assembly, and a sliding mechanism. The body may include an input assembly. The functional assembly may be rotatably connected to the body and rotatable between a first position and a second position in response to an input signal received by the input assembly. The sliding mechanism may be arranged inside the body and include a sliding rail arranged on one of the body and the functional assembly, and a sliding element arranged on the other of the body and the functional assembly and slidable in the sliding rail, such that the functional assembly is able to rotate from an inside of the receiving cavity to an outside of the receiving cavity or rotate from the outside of the receiving cavity to the inside of the receiving cavity.

According to another aspect of the present disclosure, an electronic device may be provided to include a body, a functional assembly, and a sliding mechanism. The body may include an input assembly and define a receiving cavity. The functional assembly may be rotatably connected to the body and rotatable between a first position and a second position in response to an input signal received by the input assembly. The sliding mechanism may be arranged inside the body and include a sliding rail arranged on one of the body and the functional assembly, and a sliding element arranged on the other of the body and the functional assembly and slidable in the sliding rail. When the functional assembly is arranged at the first position, the sliding element may abut against an end of the sliding rail; and when the functional assembly is arranged at the second position, the sliding element may abut against an opposite end of the sliding rail.

According to another aspect of the present disclosure, an electronic device may be provided to include a shell, a display screen, a functional assembly, and a sliding element. The display screen may be connected to the shell and configured to receive an input signal, wherein the display screen and the shell may cooperatively define a receiving cavity. The functional assembly may be received in the receiving cavity and able to rotate from an outside of the receiving cavity to an inside of the receiving cavity or from the inside of the receiving cavity to the outside of the receiving cavity in response to the input signal. The sliding element may be received in the receiving cavity, slidable in an arc-shaped trajectory with respect to the shell and the functional assembly, and configured to limit a position of the functional assembly when the functional assembly is positioned inside the receiving cavity or outside the receiving cavity.

According to still another aspect of the present disclosure, an electronic device may be provided to include a body portion, a functional assembly, a sliding mechanism, a driving mechanism, and a processor. The functional assembly may be rotatably connected to the body portion. The sliding mechanism may be arranged inside the body portion and include a sliding rail arranged on one of the body and the functional assembly, and a sliding element arranged on the other of the body and the functional assembly and slidable along the sliding rail. The driving mechanism may be configured to drive the functional assembly to rotate, such that the functional assembly is able to rotate from an inside of the body portion to an outside of the body portion or from the outside of the body portion to the inside of the body portion. The processor may be configured to receive a control instruction to control the driving mechanism to drive the functional assembly to rotate.

BRIEF DESCRIPTION OF DRAWINGS

To further illustrate technical solutions of embodiments of the present disclosure clearly, appended figures for embodiment description are briefly described herein. Obviously, the figures to be described are only for some of the embodiments. To ordinary skilled in the art, without creative effort, other figures may be obtained based on the provided figures.

DETAILED DESCRIPTION

Figure 1:
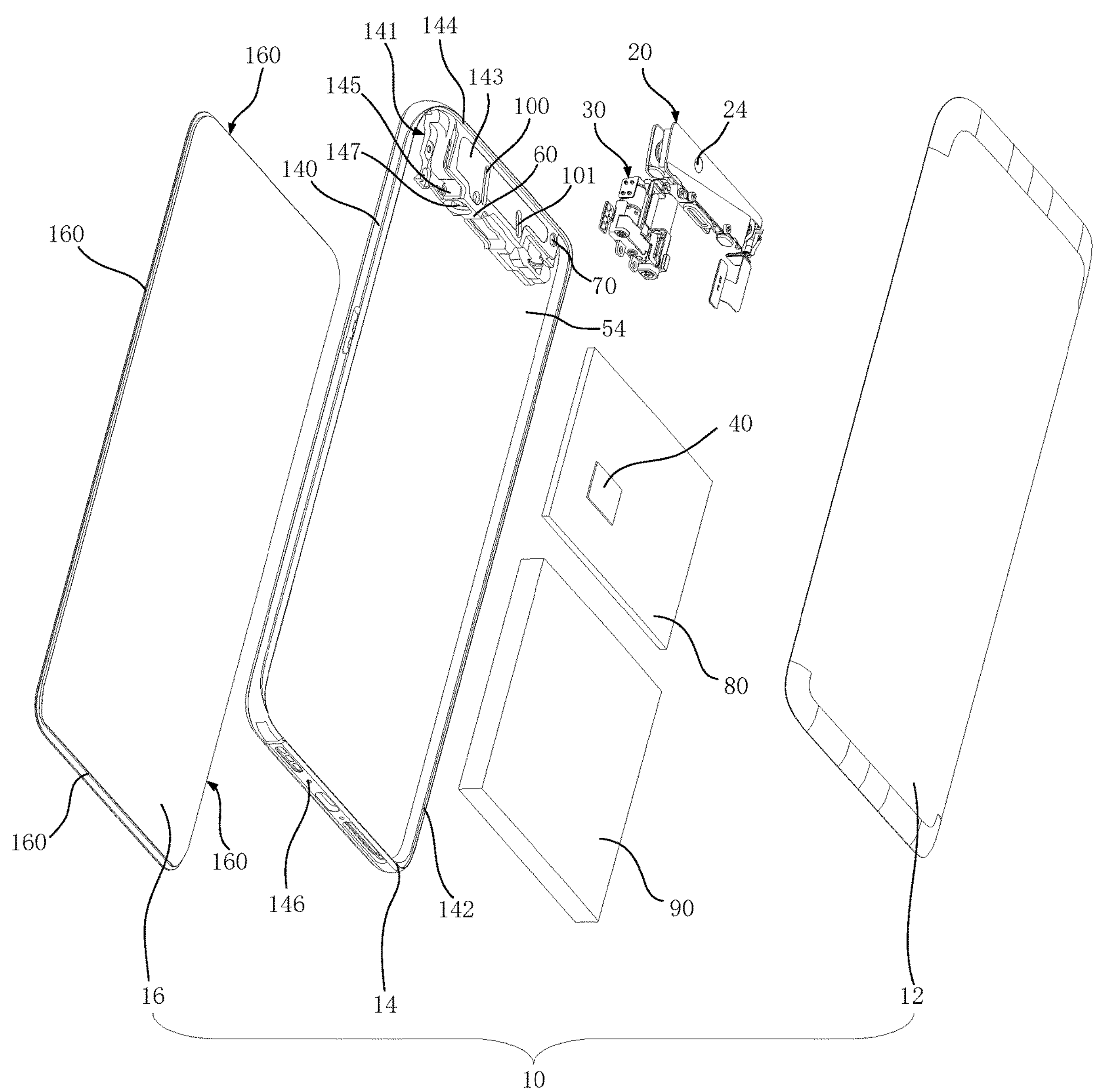
FIG. 1 is an explosive perspective view of an electronic device according to an embodiment of the present disclosure.

The present disclosure is to be further clearly described in details by referring to appended figures and embodiments. Obviously, the described embodiments are only a part of, but not all of, the embodiments of the present disclosure. Based on the embodiments of the present disclosure, any other embodiments obtained by an ordinary skilled in the art without creative effort should be within the scope of the present disclosure.

"Embodiment" mentioned herein indicates at least one embodiment, which combines specific features, structures or properties as described in the embodiment and are within the scope of the present disclosure. The "embodiment" occurred at various parts of the specification may not refer to a same embodiment, and may not refer to an independent or a backup embodiment, which is exclusive from other embodiments. Skilled in the art should explicitly and implicitly understand that the embodiments described in the present disclosure may associate with other embodiments.

According to an aspect of the present disclosure, an electronic device may be provided to include a body, a functional assembly, and a sliding mechanism. The body may define a receiving cavity. The functional assembly may be rotatably connected to the body. The sliding mechanism may be arranged in the body and include a sliding rail, arranged on one of the body and the functional assembly, and a sliding element arranged on the other of the body and the functional assembly and slidable along the sliding rail. In this way, the functional assembly is able to rotate from an inside of the receiving cavity to an outside of the receiving cavity or rotate from the outside of the receiving cavity to the inside of the receiving cavity.

In some embodiments, the functional assembly may include a swinging member, rotatably arranged on the body, wherein the sliding element or the sliding rail may be arranged on the swinging member; and a functional component, arranged on the swinging member.

In some embodiments, the electronic device may further include a rotation shaft, fixed on the swinging member or the body. The functional assembly may be connected to the body through the rotation shaft, and the sliding rail may be in shape of an arc. A center of the arc may lie on an axle center of the rotation shaft.

In some embodiments, the swinging member may include a first end portion, a second end portion disposed oppositely to the first end portion, and a connection portion connected between the first end portion and the second end portion. The rotation shaft may be arranged on the connection portion and spaced apart from the sliding element or the sliding rail. The functional component may be arranged between the first end portion and the rotation shaft, and a distance between the rotation shaft and the first end portion may be greater than a distance between the rotation shaft and the second end portion.

In some embodiments, the swinging member may include a first end portion, a second end portion disposed oppositely to the first end portion, and a connection portion connected between the first end portion and the second end portion. The rotation shaft may be arranged at the second end portion, and the functional component may be arranged between the first end portion and the second end portion.

In some embodiments, the number of the sliding mechanisms may be two or more. Sliding rails of the two or more sliding mechanisms may be in shape of arcs, and centers of the arcs in which the sliding rails may be located are coincident with each other.

In some embodiments, the electronic device may further include a pushrod configured to push the functional assembly to rotate. A guide track may be arranged on one of the pushrod and the functional assembly, and a guiding element may be arranged on the other one of the pushrod and the functional assembly. The guiding element may be arranged in the guide track and slidable along the guide track when the functional assembly is rotating.

In some embodiments, the sliding rail may include a sliding groove defined in the functional assembly, and the sliding element may include a sliding block arranged on the body and located in the sliding groove.

In some embodiments, the functional assembly has a first position at which the functional assembly is positioned inside the receiving cavity and a second position at which the functional assembly is positioned outside the receiving cavity; when the functional assembly is located at the first position, the sliding element may abut against a side wall at an end of the sliding rail; and when the functional assembly is located at the second position, the sliding element may abut against a side wall at an opposite end of the sliding rail.

In some embodiments, the functional assembly may be configured to rotate in a first direction and a second direction from the inside of the receiving cavity to the outside of the receiving cavity.

In some embodiments, the body may include a rear cover, a middle frame connected to the rear cover, and a display screen arranged to cover the rear cover.

In some embodiments, the middle frame may include a first side frame, a second side frame disposed oppositely to the first side frame, a third side frame, and a fourth side frame disposed oppositely to the third side frame. The third side frame and the fourth side frame may be connected to the first side frame and the second side frame respectively. Any one of the first side frame, the second side frame, the third side frame, and the fourth side frame may define an opening, the opening may communicate with the receiving cavity, and the functional assembly may be able to rotate to the outside of the receiving cavity through the opening.

In some embodiments, the first side frame defines the opening, and the first side frame is divided into two subframes by the opening.

In some embodiments, the first side frame defines the opening, and the first side frame is disconnected from the second side frame or the third side frame adjacent to the first side frame by the opening.

In some embodiments, the middle frame may include a first side frame, a second side frame disposed oppositely to the first side frame, a third side frame, and a fourth side frame disposed oppositely to the third side frame. The third side frame and the fourth side frame may be connected to the first side frame and the second side frame respectively. The first side frame may be disconnected from the third side frame at an intersection between the first side frame and the third side frame, such that a length of the first side frame may be less than a length of an edge of the display screen corresponding to the first side frame and less than a length of an edge of the rear cover corresponding to the first side frame. A length of the third side frame may be less than a length of an edge of the display screen corresponding to the third side frame and less than a length of an edge of the rear cover corresponding to the third side frame. A length of the second side frame may be substantially equal to a length of an edge of the display screen corresponding to the second side frame and substantially equal to a length of an edge of the rear cover corresponding to the second side frame. A length of the fourth side frame may be substantially equal to a length of an edge of the display screen corresponding to the fourth side frame and substantially equal to a length of an edge of the rear cover corresponding to the fourth side frame. The first side frame, the third side frame, the display screen, and the rear cover may cooperatively define an opening. The opening may communicate with the receiving cavity, and the functional assembly may be able to rotate to the outside of the receiving cavity through the opening.

In some embodiments, the functional component may be able to rotate to the outside of the receiving cavity from at least one of the first side frame and the third side frame.

In some embodiments, the middle frame may include a first side frame, a second side frame disposed oppositely to the first side frame, and a third side frame connected to the first side frame and the second side frame.

A length of the first side frame is less than a length of an edge of the display screen corresponding to the first side frame and less than a length of an edge of the rear cover corresponding to the first side frame, and a length of the second side frame is less than a length of an edge of the display screen corresponding to the second side frame and less than a length of an edge of the rear cover corresponding to the second side frame, such that the first side frame may be disconnected from the second side frame. A length of the third side frame may be substantially equal to a length of an edge of the display screen corresponding to the third side frame and substantially equal to a length of an edge of the rear cover corresponding to the third side frame, such that the display screen, the rear cover, an end face at one end of the first side frame that is disconnected from the third side frame, and an end face at one end of the second side frame that is disconnected from the third side frame may cooperatively define an opening. The opening may communicate with the receiving cavity, and the functional component may be able to rotate to the outside of the receiving cavity through the opening.

In some embodiments, the rear cover may include a first sub-cover and a second sub-cover. The first sub-cover may be fixed with the functional assembly, and the middle frame may be connected between the display screen and the second sub-cover to cooperatively define an opening. When the functional assembly is entirely received in the receiving cavity, the first sub-cover may be arranged to cover the opening and spliced with the second sub-cover.

In some embodiments, the display screen may be rectangular and include four first side faces connected to each other in an end-to-end manner. The functional component may include a camera module. The camera module may include a bottom face, in shape of a rectangle and fixed on the swinging member, and four second side faces, wherein each of the four second side faces may be connected to a corresponding edge of the bottom face and substantially perpendicular to the bottom face. The bottom face of the camera module may be fixed on a side of the swinging member that is close to the display screen. When the functional assembly is received in the receiving cavity, each of the second side faces of the camera module may be tilted to a corresponding first side face of the display screen. When the functional assembly rotates to the outside of the receiving cavity, the camera module may be located at the outside of the receiving cavity, and at least one of the second side faces of the camera module may be substantially parallel to at least one first side face of the display screen.

In some embodiments, the functional component may further include a receiver. The receiver may be arranged on the side of the swinging member that is close to the display screen. The camera module and the receiver may be arranged on a same side of a rotational axis of the functional assembly. The receiver may be disposed closer to the rotational axis than the camera module.

In some embodiments, the electronic device may further include a front flash, wherein the front flash may be arranged on the side of the swinging member that is close to the display screen and disposed closer to the camera module than the rotational axis and the receiver.

In some embodiments, the electronic device may further include a rear flash. The rear flash may be arranged on the side of the swinging member that is close to the display screen and symmetric with the front flash. The front flash and the rear flash may be connected to a same flexible printed circuit board.

In some embodiments, the display screen may define a display region. When the functional assembly is received in the receiving cavity, at least a part of the functional assembly may be covered by the display region.

In some embodiments, the number of the functional assemblies may be two or more.

In some embodiments, rotational axes of the two or more functional assemblies may be coincident with each other.

According to another aspect of the present disclosure, an electronic device may be provided to include a body, a functional assembly, and a sliding mechanism. The body may include an input assembly. The functional assembly may be rotatably connected to the body and rotatable between a first position and a second position in response to an input signal received by the input assembly. The sliding mechanism may be arranged inside the body and include a sliding rail, arranged on one of the body and the functional assembly, and a sliding element arranged on the other of the body and the functional assembly and slidable in the sliding rail, such that the functional assembly is able to rotate from an inside of the receiving cavity to an outside of the receiving cavity or rotate from the outside of the receiving cavity to the inside of the receiving cavity.

According to another aspect of the present disclosure, an electronic device may be provided to include a body, a functional assembly, and a sliding mechanism. The body may include an input assembly and define a receiving cavity. The functional assembly may be rotatably connected to the body and rotatable between a first position and a second position in response to an input signal received by the input assembly. The sliding mechanism may be arranged inside the body and include a sliding rail, arranged on one of the body and the functional assembly, and a sliding element arranged on the other of the body and the functional assembly and slidable in the sliding rail. When the functional assembly is arranged at the first position, the sliding element may abut against an end of the sliding rail; and when the functional assembly is arranged at the second position, the sliding element may abut against an opposite end of the sliding rail.

According to another aspect of the present disclosure, an electronic device may be provided to include a shell, a display screen, a functional assembly, and a sliding element. The display screen may be connected to the shell and configured to receive an input signal, wherein the display screen and the shell may cooperatively define a receiving cavity. The functional assembly may be received in the receiving cavity and able to rotate from an outside of the receiving cavity to an inside of the receiving cavity or from the inside of the receiving cavity to the outside of the receiving cavity in response to the input signal. The sliding element may be received in the receiving cavity, slidable in an arc-shaped trajectory with respect to the shell and the functional assembly, and configured to limit a position of the functional assembly when the functional assembly is positioned inside the receiving cavity or outside the receiving cavity.

According to still another aspect of the present disclosure, an electronic device may be provided to include a body portion, a functional assembly, a sliding mechanism, a driving mechanism, and a processor. The functional assembly may be rotatably connected to the body portion. The sliding mechanism may be arranged inside the body portion and include a sliding rail, arranged on one of the body and the functional assembly, and a sliding element arranged on the other of the body and the functional assembly and slidable along the sliding rail. The driving mechanism may be configured to drive the functional assembly to rotate, such that the functional assembly is able to rotate from an inside of the body portion to an outside of the body portion or from the outside of the body portion to the inside of the body portion. The processor may be configured to receive a control instruction to control the driving mechanism to drive the functional assembly to rotate.

In some embodiments, the electronic device may further include a touch screen. The control instruction may be a touch-based operation received by the touch screen.

In some embodiments, the touch-based operation received by the touch screen may include at least one of a slide, a click, and a long-press.

In some embodiments, the electronic device may include an operational key, the control instruction is a triggering instruction of the operational key.

In some embodiments, the control instruction may include at least one of an image capturing request instruction, a flash turn-on request instruction, and a loudspeaker turn-on request instruction.

The electronic device provided in the present disclosure may include, but not be limited to, a device receiving/transmitting communication signals by wired connection (such as a public switched telephone network (PSTN), a digital subscriber line (DSL), a digital cable, a direct cable connection, and/or another data connection/network), and/or by a wireless interface (such as a wireless interface of a cellular network, a wireless local area network (WLAN), a digital television network such as a DVB-H network, a satellite network, an AM-FM broadcast transmitter, and/or another communication terminal). A communication terminal configured to communicate by a wireless interface may be referred as a "wireless communication terminal", a "wireless terminal", and/or a "mobile terminal". The electronic device of the present disclosure may include, but may be not limited to a satellite or cellular radiotelephone telephone, a terminal of personal communications system (PCS) that may combine cellular radiotelephone with data processing, fax, and data communication capabilities, a personal digital assistant (PDA) equipped with a radiotelephone, a pager, an internet/intranet access, a web browser, a notepad, a calendar, and/or a global positioning system (GPS) receiver, a conventional laptop and/or a palm receiver, other electronic device including a radiotelephone transceiver and the like.

Figure 2:
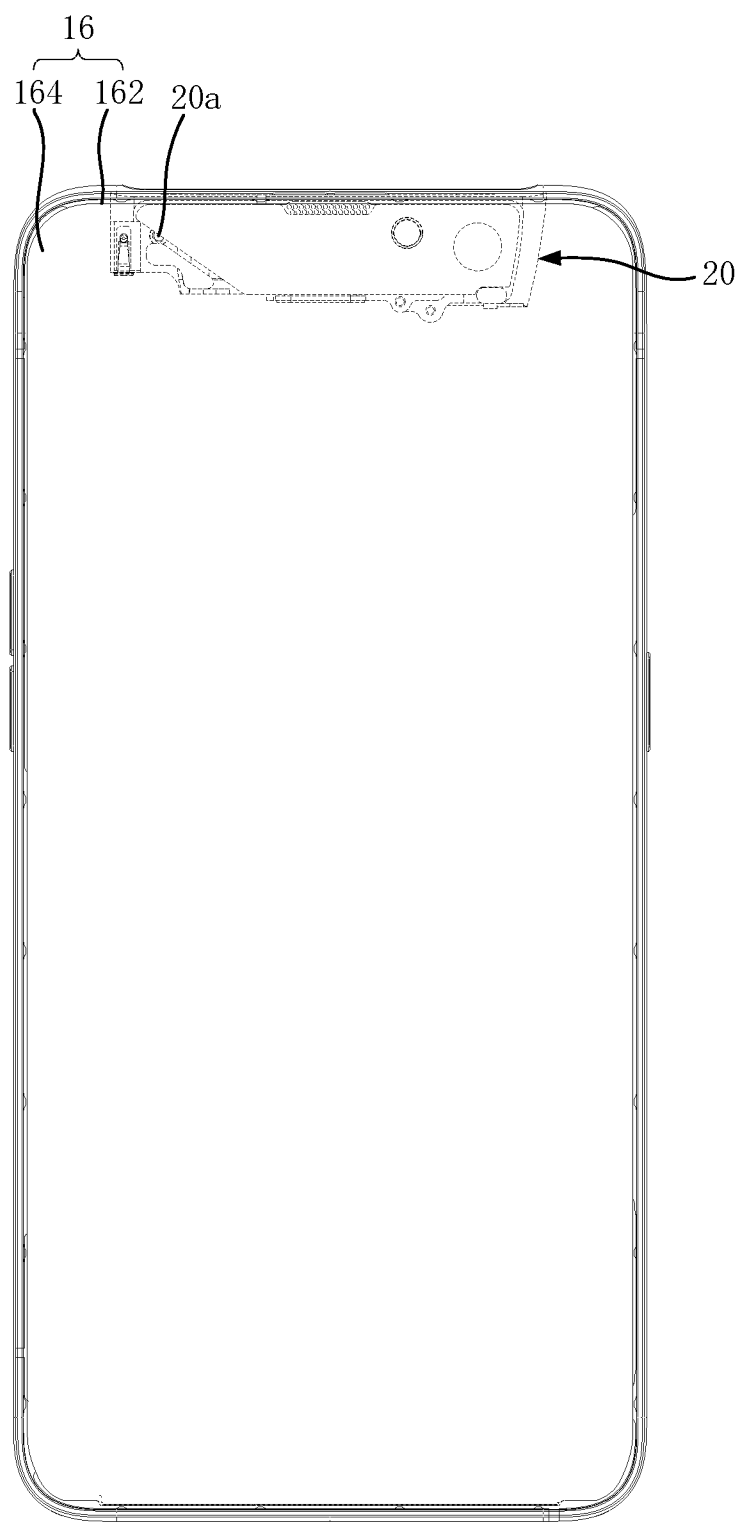
FIG. 2 is a front view of an electronic device according to an embodiment of the present disclosure, wherein a functional assembly is positioned inside the receiving cavity.
Figure 3:
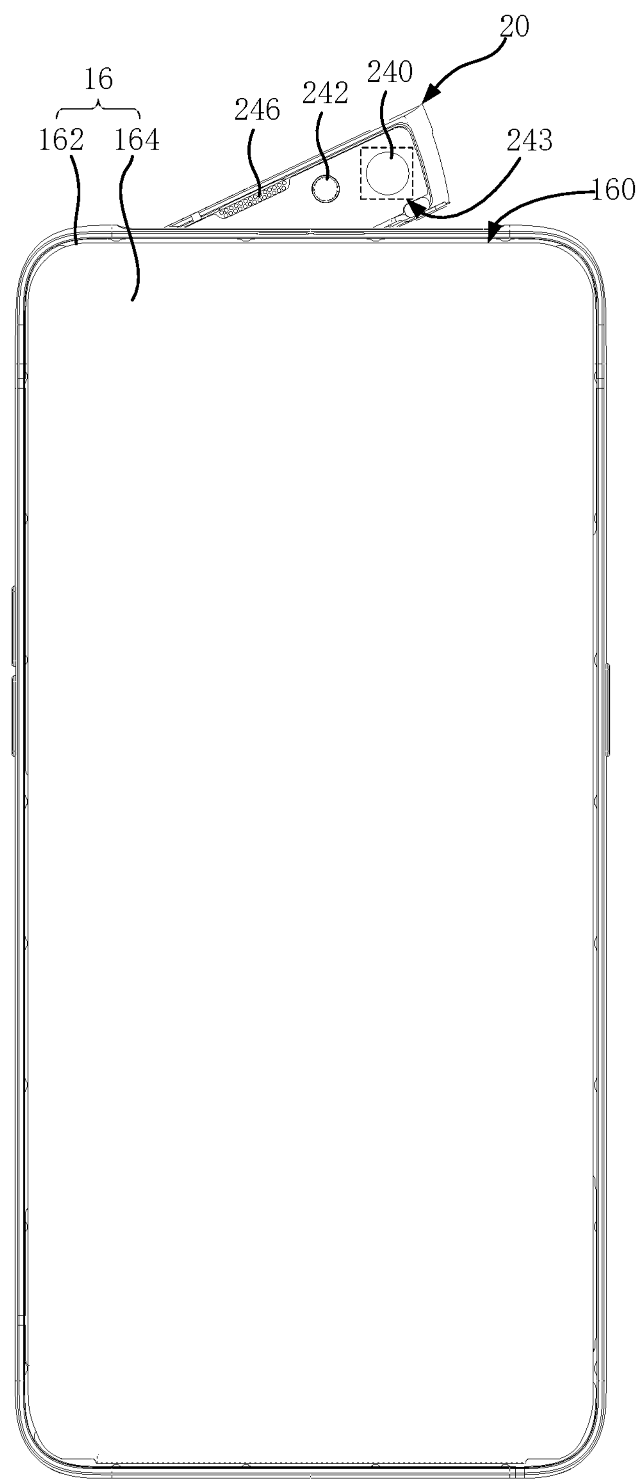
FIG. 3 is a front view of an electronic device according to an embodiment of the present disclosure, wherein a functional assembly is positioned out of the receiving cavity.

A mobile terminal may be used as an example to illustrate the present disclosure. As shown in FIG. 1, the mobile terminal according to some embodiments of the present disclosure may include a body 10, a functional assembly 20, a driving mechanism 30, a processor 40, a main board 80, a battery 90, and the like. The functional assembly 20, the driving mechanism 30, the processor 40, the main board 80, the battery 90, and the like may be disposed inside the body 10. The functional assembly 20 may be rotatably connected to the body 10. The body 10 may be configured to receive an input signal, and the processor 40 may be configured to generate a control signal based on the input signal to control the driving mechanism 30 to drive the functional assembly 20 to rotate from a position inside the body 10 to a position outside the body 10, or rotate from the position outside the body 10 to the position inside the body 10, as shown in FIG. 2 and FIG. 3.

To be specific, the body 10 may substantially include a rear cover 12, a middle frame 14 connected to the rear cover 12, and a display screen 16 connected to the middle frame 14 and cover the rear cover 12. The rear cover 12, the middle frame 14, and the display screen 16 may cooperatively define a receiving cavity 50 (shown in FIG. 4). The functional assembly 20, the driving mechanism 30, the processor 40, the main board 80, the battery 90, and the other elements may be received in the receiving cavity 50. The functional assembly 20 may rotate from a position inside the receiving cavity 50 to a position outside the receiving cavity 50, or rotate from the position outside the receiving cavity 50 to the position inside the receiving cavity 50.

In some embodiments, the rear cover 12 may be rectangular, and made of plastics, glass, ceramics, a fibrous composite, metal (such as, stainless wheel, aluminum, and the like), or other appropriate materials, or a combination thereof. In some embodiments, a part of the rear cover 12 may be made of a dielectric medium or other material with a low conductivity. In some embodiments, the rear cover 12 or at least a part of the rear cover 12 may be formed from metal elements.

Figure 4:
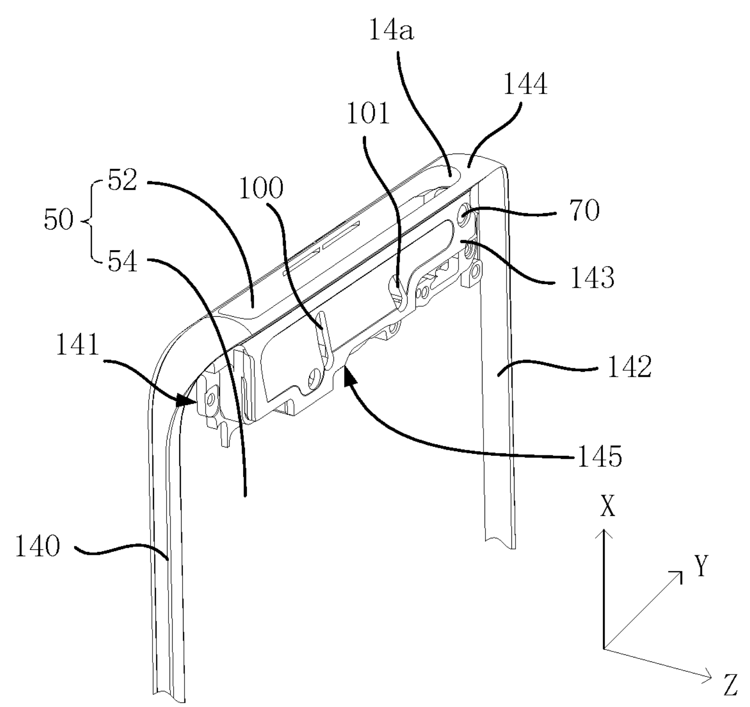
FIG. 4 is a perspective view of a portion of a middle frame of an electronic device according to an embodiment of the present disclosure.

The middle frame 14 may also be made of plastics, glass, ceramics, a fibrous composite, metal and the like. FIG. 1 and FIG. 4 illustrate structures of the middle frame 14 according to some embodiments. As shown in FIG. 1, the middle frame 14 may include a first side frame 140, a second side frame 142 opposite to the first side frame 140, a third side frame 144, and a fourth side frame 146 opposite to the third side frame 144. Each of the third side frame 144 and the fourth side frame 146 may be connected to the first side frame 140 and the second side frame 142, respectively.

In some embodiments, each of the four side frames may substantially be perpendicular the rear cover 12. The four side frames may be fixed to corresponding edges of the rear cover 12. In some embodiments, the four side frames cooperatively form a rectangular frame, such that a cross section of the middle frame 14 may substantially be rectangular. In some other embodiments, the cross section of the middle frame 14 may be circular or stadium-shaped.

In some embodiments, as shown in FIG. 1 and FIG. 4, the middle frame 14 may further include a first side board 141, a second side board 143 disposed oppositely to the first side board 141, and a partition board 145 connected between the first side board 141 and the second side board 143. The first side board 141 and the second side board 143 may be both connected to the third side frame 144. The first side board 141 may be connected to a side of the third side frame 144 close to the display screen 16, and the second side board 143 may be connected to a side of the third side frame 144 close to the rear cover 12. The second side board 143 may define two sliding grooves 100 and 101, and each of the two sliding grooves may be in shape of an arc. A center of an arc in which the sliding groove 100 is located may be coincident with a center of an arc in which the sliding groove 101 is located. In other embodiments, the second side board 143 may define only one sliding groove or a plurality (for examples, three or more) of sliding grooves.

The partition board 145 may divide the receiving cavity 50 into a first receiving space 52 and a second receiving space 54. To be specific, the first side board 141, the second side board 143, and the partition board 145 may be connected to cooperatively define the first receiving space 52. The functional assembly 20 may be received in the first receiving space 52, while the driving mechanism 30, the processor 40, the main board 80, the battery 90, and other elements may be received in the second receiving space 54. The partition board 145 may define a through hole 147. The through hole 147 may communicate with the first receiving space 52 and the second receiving space 54. In addition, to improve sealing between the first receiving space 52 and the second receiving space 54, a seal ring 60 may be provided inside the through hole 147.

The body 10 may define an opening (for example, at a position near the reference number 52 in FIG. 4). The opening may communicate with the receiving cavity 50. In some embodiments, the opening may communicate with the first receiving space 52, such that a portion of the functional assembly 20 may rotate from the position inside the receiving cavity 50 to the position outside the receiving cavity 50 through the opening.

In some embodiments, the opening may be defined in the middle frame 14. For example, any one of the first side frame 140, the second side frame 142, the third side frame 144, and the fourth side frame 146 may define the opening. When the functional assembly is entirely received in the receiving cavity 50, an outer edge of the functional assembly 20 may be smoothly transitioned from and spliced with an outer edge of the side frame in which the opening is defined.

To be specific, as shown in FIG. 4, in some embodiments, the third side frame 144 may define an opening 14*a*. The opening 14*a* may be defined in a middle area of the third side frame 144, and extend through the third side frame 144 along a length direction X of the mobile terminal, but may not extend through the third side frame 144 along a width direction Y and a thickness direction Z of the mobile terminal.

Figure 5:
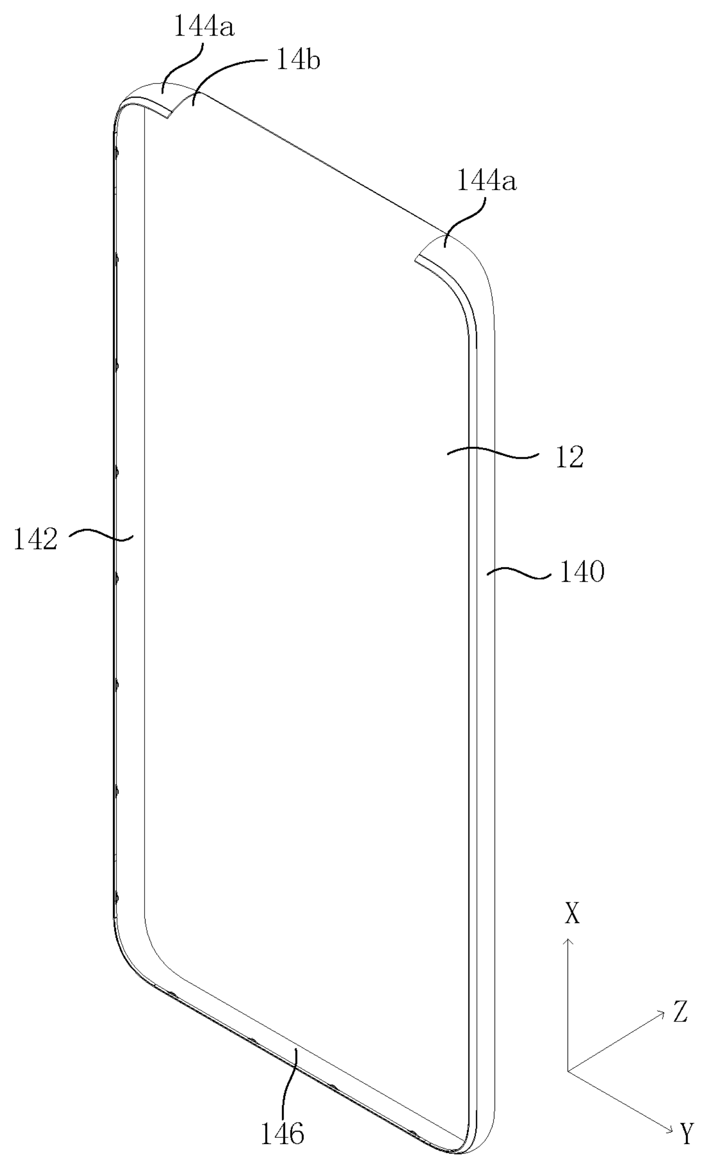
FIG. 5 is a perspective view of a middle frame of an electronic device according to another embodiment of the present disclosure.

In some other embodiments, as shown in FIG. 5, the opening 14*b* may extend through the third side frame 144 along the length direction X and the thickness direction Z, but may not extend through the third side frame 144 along the width direction Y. In this way, the third side frame 144 may be divided into two sub-frames 144*a*.

Figure 6:
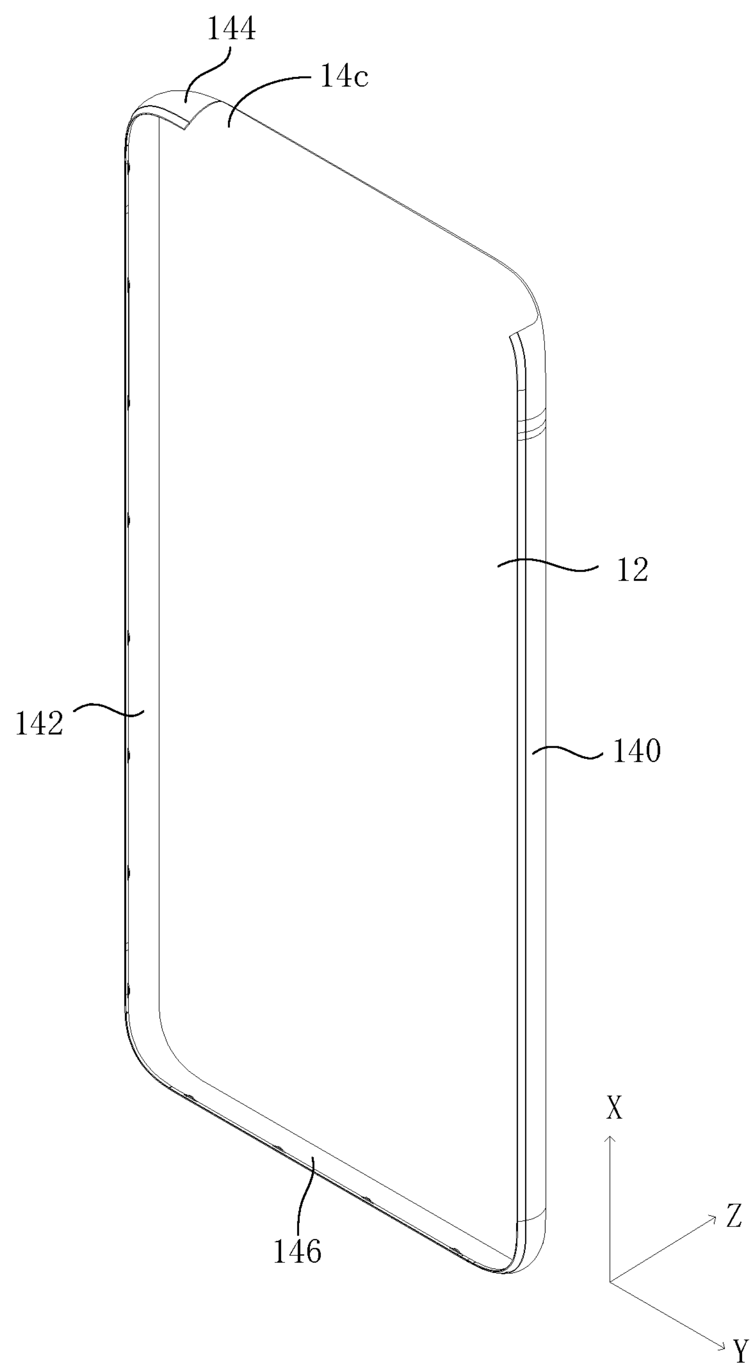
FIG. 6 is a perspective view of a middle frame of an electronic device according to still another embodiment of the present disclosure.

In still some other embodiments, the opening may be defined at an end of the third side frame 144, such that the third frame 144 may be disconnected with a side frame adjacent to the third side frame 144 via the opening. For example, in FIG. 6, an opening 14*c* may extend through a part of the third side frame 144 along the width direction Y of the mobile terminal, such that the third side frame 144 may be disconnected with the adjacent first side frame 140.

In some other embodiments, the opening may be defined in two adjacent side frames. For example, according to an embodiment shown in FIG. 7, an opening 14*d* may be defined in the first side frame 140 and the third side frame 144.

To be specific, in some implementations, a length of the first side frame 140 and a length of the third side frame 144 may both be less than that of each of respective side edges of the display screen 16 the rear cover 12 (that is, the length of the first side frame 140 may be less than a length of a side edge of the display screen 16 connected to the first side frame 140 and a length of a side edge of the rear cover 12 connected to the first side frame 140; and the length of the third side frame 144 may be less than a length of another side edge of the display screen 16 connected to the third frame 144 and a length of another side edge of the rear cover 12 connected to the third frame 144). In this way, the first side frame 140 and the third side frame 144 may be disconnected from each other at an intersection therebetween. In addition, a length of the second side frame 142 and a length of the fourth side frame 146 may both be substantially equal to that of each of respective side edges of the display screen 16 and the rear cover 12 (that is, the length of the second side frame 142 may be substantially equal to a length of a side edge of the display screen 16 connected to the second side frame 142 and a length of a side edge of the rear cover 12 connected to the second side frame 142; and the length of the fourth side frame 146 may be substantially equal to a length of another side edge of the display screen 16 connected to the fourth frame 146 and a length of another side edge of the rear cover 12 connected to the fourth frame 146). Therefore, the first side frame 140, the third side frame 144, the display screen 16, and the rear cover 12 may cooperatively define the opening 14*d*.

Figure 8:
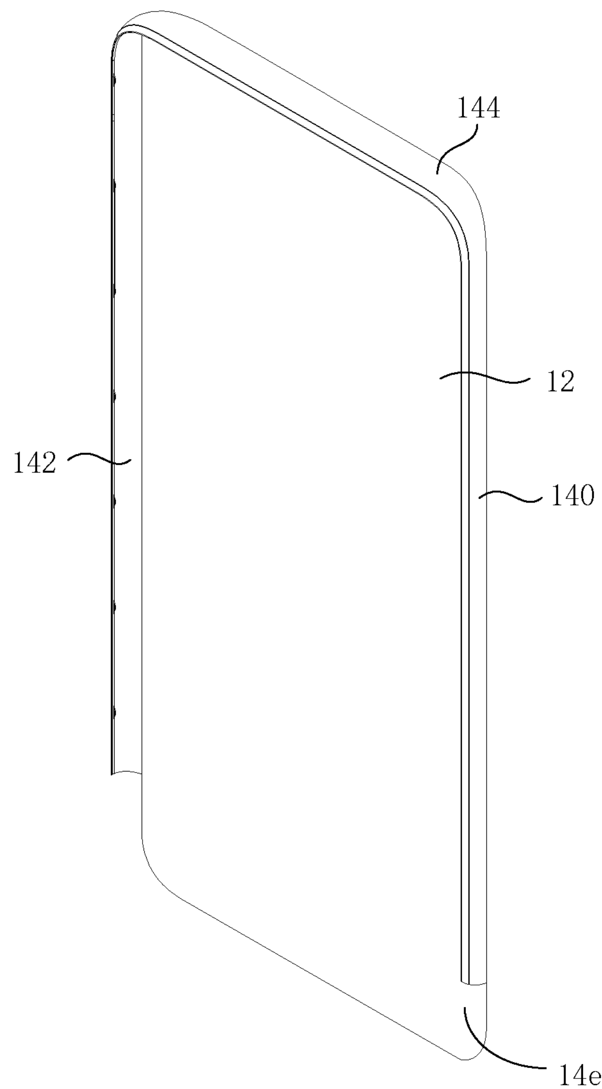
FIG. 8 is a perspective view of a middle frame of an electronic device according to still another embodiment of the present disclosure.

In some embodiments, the opening may be defined in three side frames which are successively connected with each other. To be specific, as shown in FIG. 8, in some embodiments, the middle frame 14 may include the first side frame 140, the second side frame 142 disposed oppositely to the first side frame 140, and the third side frame 144 connected to both the first side frame 140 and the second side frame 142. A length of the first side frame 140 and a length of the second side frame 142 may both be less than that of respective side edges of the display screen 16 and the rear cover 12 (that is, the length of the first side frame 140 may be less than a length of a side edge of the display screen 16 connected to the first side frame 140 and a length of a side edge of the rear cover 12 connected to the first side frame 140; and the length of the second side frame 142 may be less than a length of another side edge of the display screen 16 connected to the second frame 142 and a length of another side edge of the rear cover 12 connected to the second frame 142). In addition, a length of the third side frame 144 may be substantially equal to that of respective side edges of the display screen 16 and the rear cover 12 (that is, the length of the third side frame 144 may be substantially equal to a length of a side edge of the display screen 16 connected to the third side frame 144 and a length of a side edge of the rear cover 12 connected to the third side frame 144). In this way, an opening 14*e* may be defined by an end face of the first side frame 140 that is not connected to the third side frame 144 and an end face of the second side frame 142 that is not connected to the third side frame 144.

In the above embodiments, the functional assembly 20 may have an outer edge. When the functional assembly is entirely received in the receiving cavity 50, the outer edge of the functional assembly 20 may fit with an outline of the display screen 16 and the rear cover 12, such that the functional assembly 20 may completely close the opening to form an enclosed external frame of the mobile terminal, and prevent dirt from entering the receiving cavity, such that elements in the receiving cavity 50 may be protected.

In some other embodiments, each of two opposite side frames may define an opening. For example, according to an embodiment shown in FIG. 9, each of the first side frame 140 and the second side frame 142 may define an opening 14*f*. The opening 14*f* may extend through the first side frame 140 and the second side frame 142 along the width direction Y of the mobile terminal, but may not extend through the first side frame 140 and the second side frame 142 along the length direction X of the mobile terminal.

In some embodiments, a rotatable cover (not shown in the figure) may be provided at the opening 14*f*. The rotatable cover may be rotatably connected to the rear cover 12 or the middle frame 14. When the functional assembly is entirely received in the receiving cavity 50, the rotatable cover may cover the opening 14*f*. When the functional assembly 20 rotates to the outside of the receiving cavity, the rotatable cover may be pushed away by the functional assembly 20.

Figure 10:
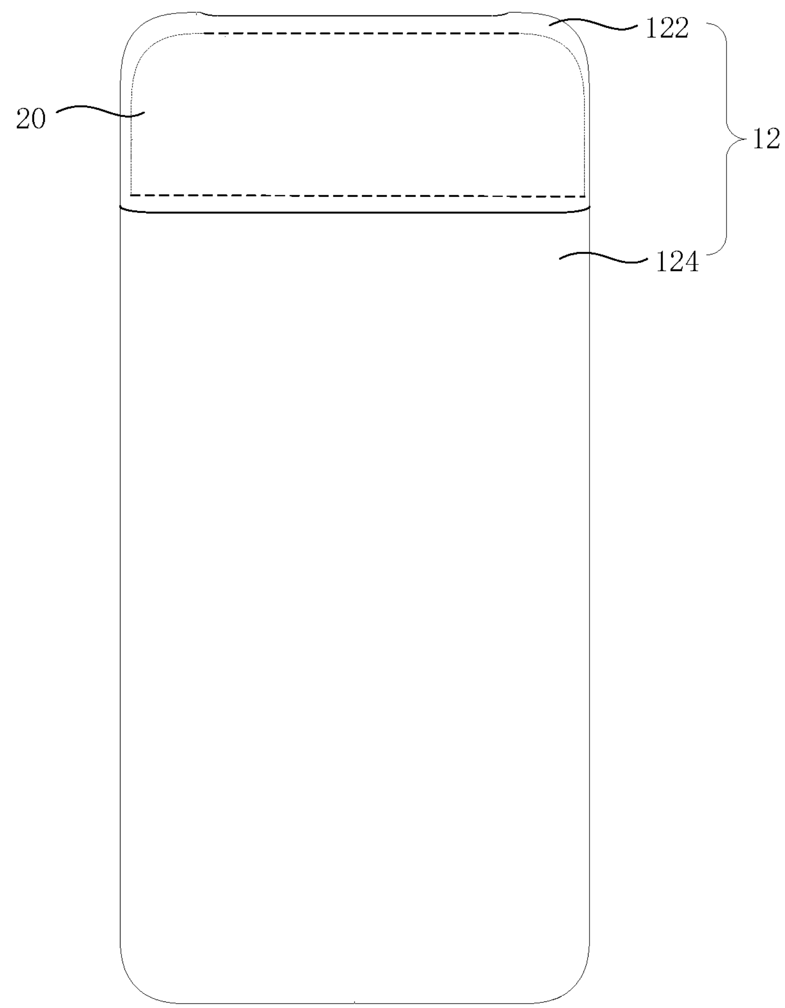
FIG. 10 is a plane schematic view of a rear cover of an electronic device according to an embodiment of the present disclosure, wherein a functional assembly is positioned inside the receiving cavity.
Figure 11:
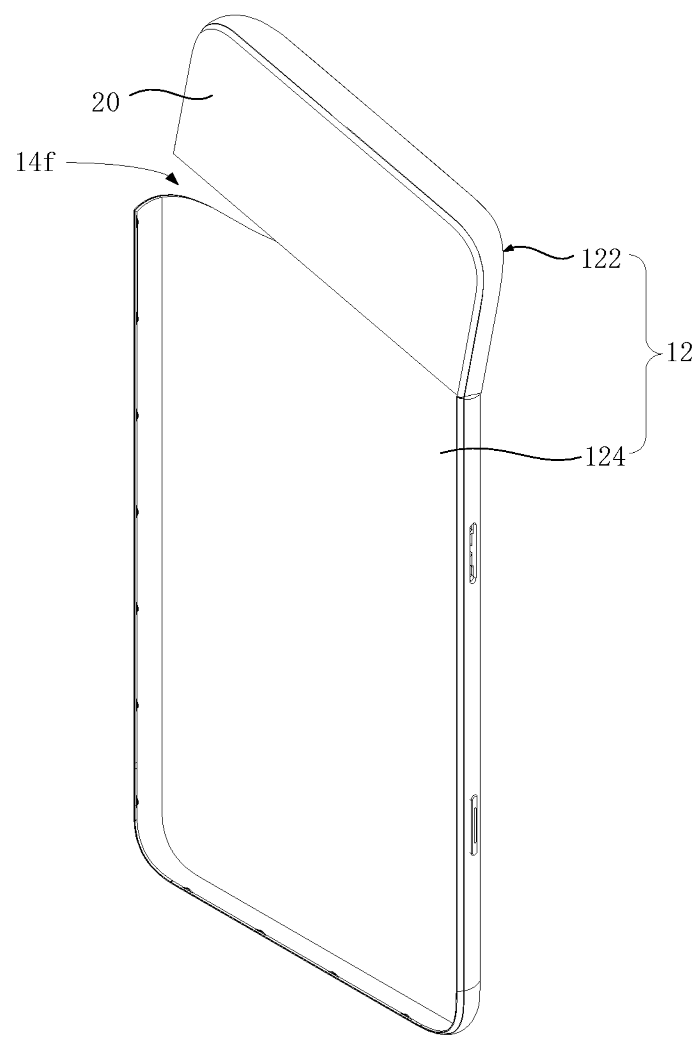
FIG. 11 is a plane schematic view of a rear cover of an electronic device according to another embodiment of the present disclosure, wherein a functional assembly is positioned out of the receiving cavity.

In some other embodiments, the opening may be defined on the rear cover 12. As shown in FIG. 10 and FIG. 11, in some embodiments, the rear cover 12 may include a first sub-cover 122 and a second sub-cover 124. The first sub-cover 122 may be fixed with the functional assembly 20, and the middle frame 14 may be connected between the display screen 16 and the second sub-cover 124, such that the middle frame 14, the display screen 16, and the second sub-cover 124 may cooperatively define an opening 14*g*. When the functional assembly 20 is entirely received in the receiving cavity 50, the first sub-cover 122 may cover the opening 14*g* and smoothly transitioned from and spliced with the second sub-cover 124 to form a complete outer structure of the mobile terminal. In some embodiments, the second sub-cover 124 may have a step structure, a step (not shown in the figure) may be formed at a side of the sub-cover 124 that is close to the first sub-cover 122. When the functional assembly 20 is entirely received in the receiving cavity 50, the first sub-cover 122 together with the functional assembly 20 may be arranged to cover on the step to prevent the functional assembly 20 from being exposed to the outside while not in use.

In addition, the middle frame 14 may define other structures, such as a groove, a hole, and the like. The other structures may be configured to arrange elements for specific functions. It is also possible that exterior elements to achieve specific elements may be connected to the mobile terminal in a detachable manner through the other structures. It is also possible that the other structures may be used as a channel through which audio signals or the like may be input or output. For example, the structure may include a groove configured to arrange a power button, a groove configured to arrange a volume control key, or a sound transmission hole, an earphone jack, a socket for a data line/power line, and the like.

As shown in FIG. 2 and FIG. 3, the display screen 16 may be electrically connected to the functional assembly 20, a processor 40, and the like, and configured to display information. In some embodiments, the display screen 16 may be rectangular, and may have four side faces 160 connected to each other end-to-end. The display screen 16 may define a display region 162 and a non-display region 164. When the functional assembly 20 is received in the receiving cavity 50, at least a part of the functional assembly 20 may be covered by the display region 162.

In some embodiments, the display screen 16 may include pixels generated by a light emitting diode (LED) or an organic light emitting diode (OLED), a liquid crystal display (LCD) assembly, or other appropriate pixel structure. A surface of the display screen 16 may be covered by a plate made of transparent glass or layers of plastics. In addition, the display screen 16 may further include a touch electrode, such that the display screen may be used as a touch screen for inputting information, and a user may input signals by a touch operation or perform operations to the information shown on the display screen 16.

The functional assembly 20 may be configured to achieve at least one function distinctive to a display function of the display screen 16. The functional assembly 20 may rotate with respect to the body 10 when the functional assembly is driven by the driving mechanism 30. A rotational axis 20*a* of the functional assembly 20 may extend along a thickness direction of the electronic device. That is, the rear cover 12 and the display screen 16 may both be substantially parallel with a rotational plane of the functional assembly 20.

The rotatable configuration of the functional assembly 20 allows the functional assembly 20 to reach various positions on the rotational plane. To be specific, in some embodiments, the functional assembly 20 may rotate between a first position and a second position. When the functional assembly 20 needs to be used, the functional assembly 20 may rotate to a position outside the receiving cavity to achieve a function of the functional assembly 20. When the functional assembly 20 is not needed, the functional assembly 20 may be received in the receiving cavity 50 and covered by the display screen 16. Therefore, the functional assembly 20 may no longer occupy extra space of the display screen 16, and the display screen 16 may be arranged at the front face and occupy the area of the front face as large as possible. In this way, the mobile terminal may have a greater screen occupation ratio.

When the functional assembly 20 is at the first position, the functional assembly 20 may be entirely received in the receiving cavity 50. At this time, a projection of the functional assembly 20 on the display screen 16 may be entirely within the display screen 16, and the functional assembly 20 may not achieve any function due to being covered by the display screen 16, as shown in FIG. 2.

When the functional assembly 20 is at the second position, a part of the functional assembly 20 may protrude out of the receiving cavity 50. At this time, only a part of the projection of the functional assembly 20 on the display screen 16 may be within the display screen 16, and the other part of the projection of the functional assembly 20 on the display screen 16 may be located out of the display screen 16. That is, a part of the functional assembly 20 may not be covered by the display screen 16, such that the functions of the functional assembly 20 may be achieved normally, as shown in FIG. 3.

In other embodiments, the functional assembly 20 may rotate between the first position, the second position, and the third position. When the functional assembly 20 is at the third position, a part of the functional assembly 20 may protrude out of the receiving cavity 50. The third position may be different from the second position.

It should be understood that the first, the second, and the third positions as described above may be example to illustrate that the functional assembly may be located at different positions. However, practically, the functional assembly 20 may be located at other positions. Regardless of which position the functional assembly 20 is located at, the display function of the display screen 16 may not be impacted. The functional assembly 20 may not occupy any area of the display screen 16, such that a display area of the display screen 16 may be increased, and a display occupation ratio may be increased.

Figure 12:
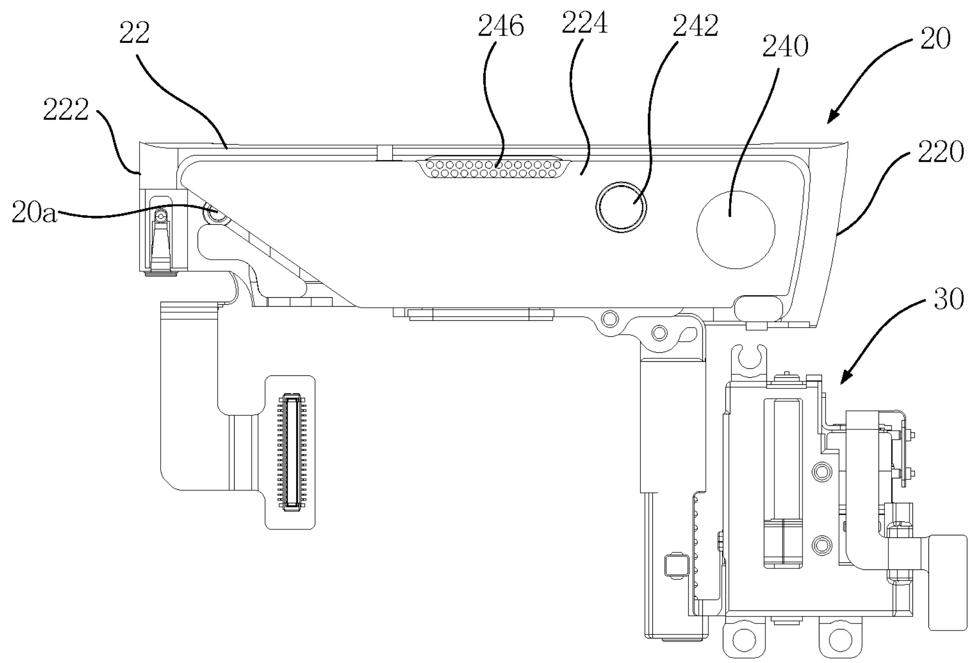
FIG. 12 is a schematic view of a side of a functional assembly and a driving mechanism close to a display screen according to an embodiment of the present disclosure.
Figure 13:
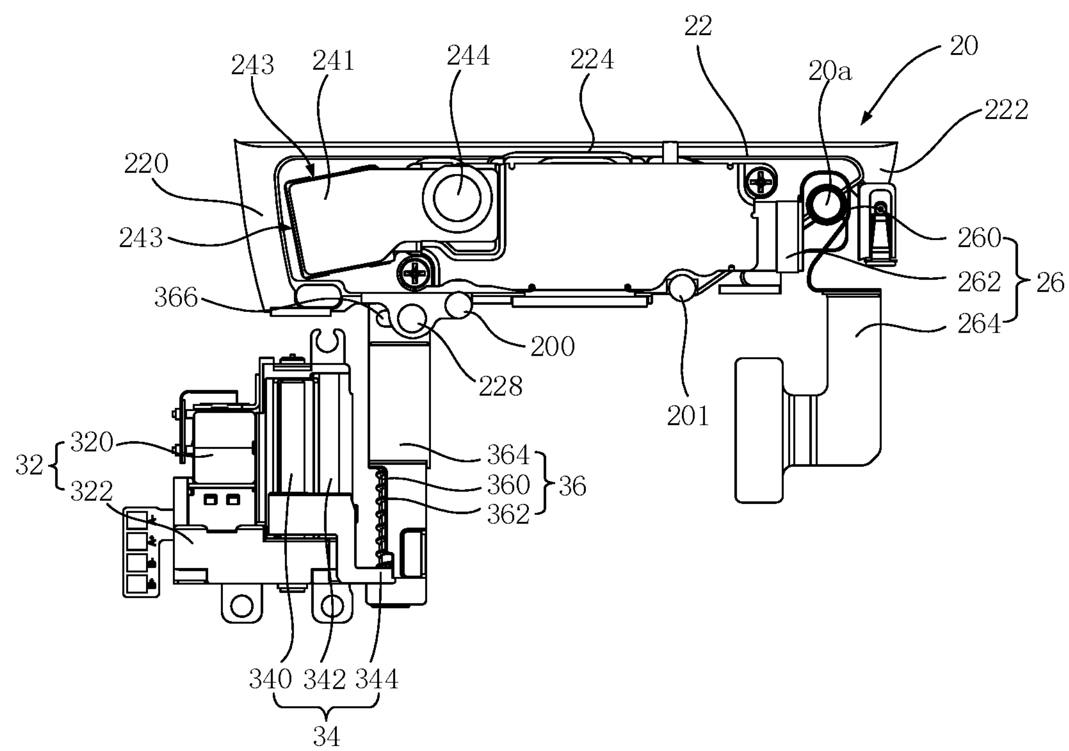
FIG. 13 is a schematic view of a side of a functional assembly and a driving mechanism close to a rear cover according to an embodiment of the present disclosure.

To be specific, as shown in FIG. 12 and FIG. 13 accompanying with FIG. 1, the functional assembly 20 may include a swinging member 22 rotatably connected to the middle frame 14 and a functional component 24 arranged on the swinging member 22. Rotation of the swinging member 22 may drive the functional component 24 to move with respect to the body 10, such that a position of the functional component 24 with respect to the body 10 may be changed, and the functional component 24 on the swinging member 22 may be exposed to the outside of the body 10. When the functional assembly 20 rotates between the first, the second, and the third positions, the functional component 24, which is exposed to the outside of the body 10 when the swinging member 22 reaches the second position, may be the same as or different from, the functional component 24 which is exposed to the outside of the body 10 when the swinging member 22 reaches the third position.

The swinging member 22 may be substantially stripped. In other embodiments, the swinging member 22 may be in other shapes. The swinging member 22 may be made of plastics, metals, or other materials. The swinging member 22 may include a first end portion 220, a second end portion 222 opposite to the first end portion 220, and a connection portion 224 connected between the first end portion 220 and the second end portion 222.

To be specific, in some embodiments, the swinging member 22 may rotate between the first position and the second position, and may be rotatably connected to the middle frame 14 through a rotation shaft 70 fixed on the middle frame 14. On this occasion, the rotational axis 20*a* of the swinging member 22 may be an axle center of the rotation shaft 70. The centers of the arc in which the sliding grooves 100 and 101 defined on the middle frame 14 are located may lie on the axle center of the rotation shaft 70. In addition, two sliding blocks 200 and 201 may be arranged on the swinging member 22. The sliding block 200 may correspond to the sliding groove 100, and the sliding block 201 may correspond to the sliding groove 101. The sliding block 200 may be arranged in the sliding groove 100 and slidable along the sliding groove 100. The sliding block 201 may be arranged in the sliding groove 101 and slidable along the sliding groove 101. The sliding grooves 100 and 101, and the sliding blocks 200 and 201 may compose a sliding mechanism of the electronic device, such that the swinging member 22 my rotate along the sliding mechanism smoothly. In addition, a guide block 228 may be further arranged on the swinging member 22, and the guide block 228 may cooperate with the driving mechanism 30.

A plurality of functional components 24 may be arranged on the swinging member 22. The plurality of functional components 24 may be connected to the main board 80 through a flexible printed circuit board 26. In some embodiments, the functional components 24 may include a camera module 240 and a front flash 242. The front flash 242 may be supplementary to a photographic function of the camera module 240. The camera module 240 may have photographing and video-recording functions to provide the electronic device with a video call function, photographic function, and the like. The functional components 24 may further include a rear flash 244 and a receiver 246. The rear flash 244 and the receiver 246 may have functions independent from the photographic function of the camera module 240. It may be understood that, in other embodiments, the functional components 24 may further include a microphone, a loudspeaker, a light sensor, and the like.

Figure 14:
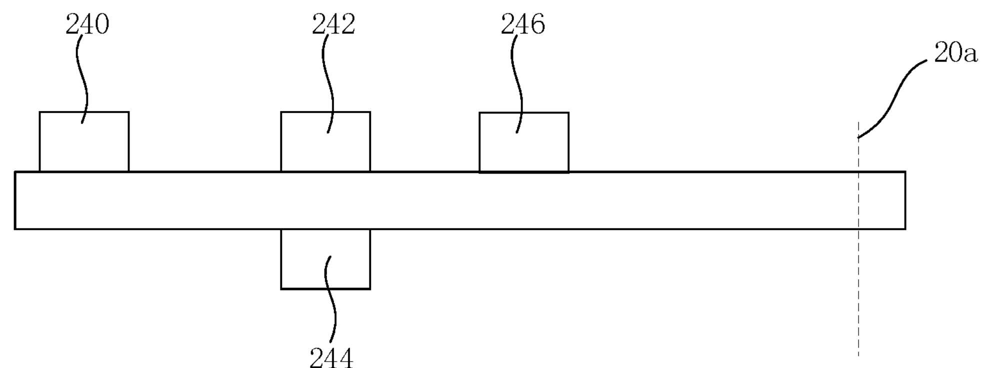
FIG. 14 is a schematic view illustrating an arrangement of functional components according to an embodiment of the present disclosure.
Figure 15:
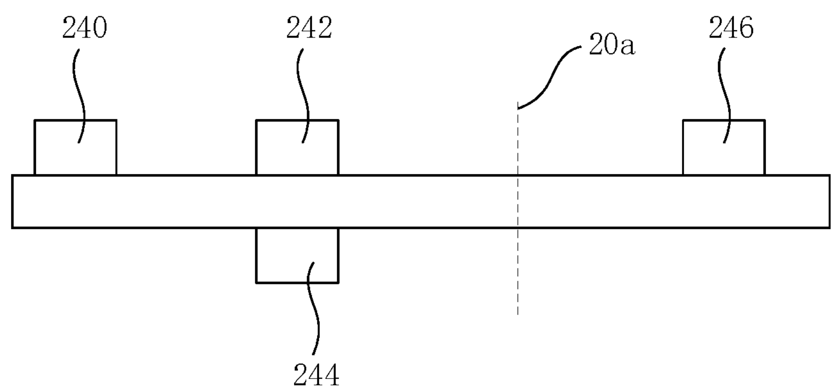
FIG. 15 is a schematic view illustrating an arrangement of functional components according to another embodiment of the present disclosure.

As shown in FIG. 14, the camera module 240, the front flash 242, and the receiver 246 may all be arranged on a side of the swinging member 22 close to the display screen 16, and on a same side of the rotational axis 20*a* of the swinging member 22. In some embodiments, the front flash 242 may be arranged closer to the camera module 240 than the receiver 246 and the rotational axis 20*a*. That is the front flash 242 may be arranged adjacent to the camera module 240 (as shown in FIG. 12). The rear flash 244 may be arranged on a side of the swinging member 22 away from the display screen 16 and symmetric with the front flash 242 (as shown in FIG. 13). The rear flash 244 and the front flash 242 may be connected to the same flexible printed circuit board 26. It may be understood that, in some other embodiments, as shown in FIG. 15, in other embodiments, the camera module 240 and the front flash 242 may be arranged on the same side of the rotational axis 20*a*, and the receiver 246 may be arranged on an opposite side of the rotational axis 20*a*. Therefore, when he swinging member 22 is at the second and the third positions, different functional components may be exposed to the outside of the body 10.

Figure 16:
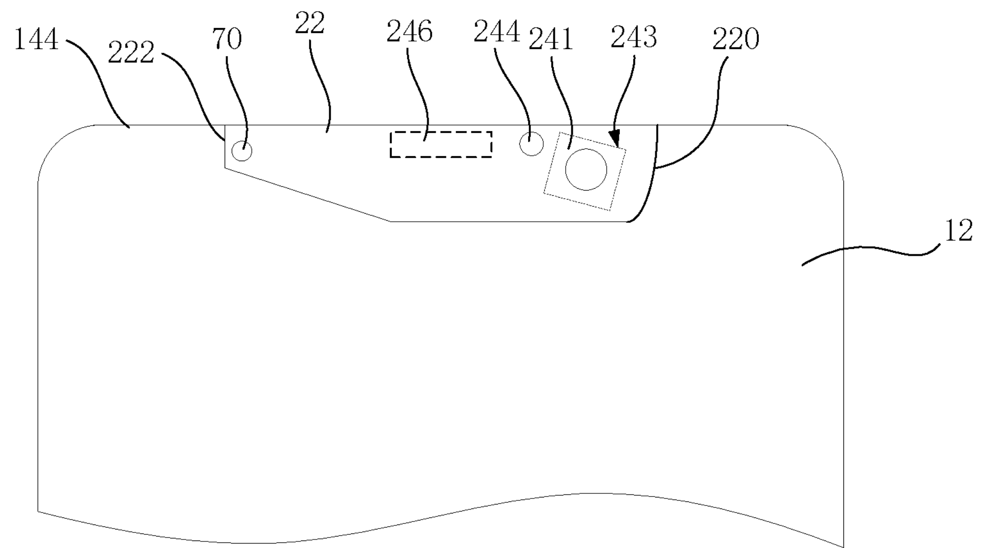
FIG. 16 is a schematic view illustrating a functional assembly at a first position according to an embodiment of the present disclosure.
Figure 17:
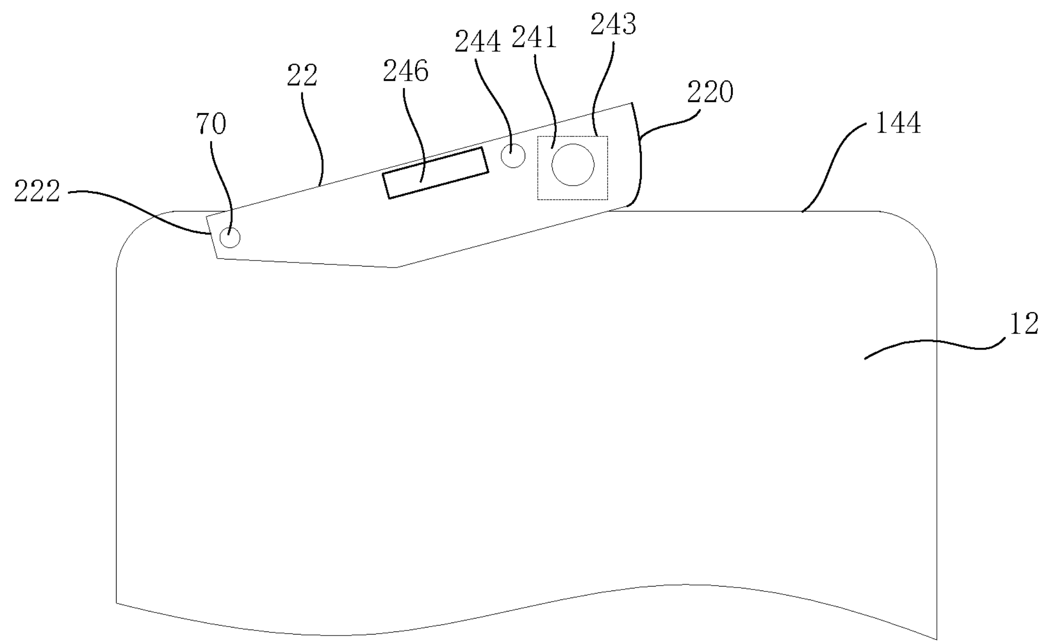
FIG. 17 is a schematic view illustrating a functional assembly at a second position according to an embodiment of the present disclosure.

To be specific, in some embodiments, as shown in FIGS. 16-17, the camera module 240 may be cubic, and an optical axis of the camera module 240 may be substantially perpendicular to the rotational plane of the swinging member 22. The camera module 240 may include a bottom face 241 and four side faces 243. The bottom face 241 may be rectangular and fixed on the swinging member 22. The four side faces 243 may be respectively connected to four edges of the bottom face 241 and substantially perpendicular to the bottom face 241. When the functional assembly 20 is located inside the receiving cavity 50, each of the side faces 243 of the camera module 240 may be tilted with respect to each side face of the display screen 16. For example, in some embodiments, an angle between a side face at a bottom of the camera module 240 and a side face at a top of the display screen 16 may be approximately 10°, as shown in FIG. 16. When the functional assembly 20 rotates in the first direction to the outside of the receiving cavity 50, the swinging member 22 may rotate by approximately 10°, such that the camera module 240 may be arranged at the outside of the receiving cavity 50, and two oppositely disposed side faces 243 of the camera module 240 may be parallel to the side face 160 at the top of the display screen 16, as shown in FIG. 17. When the camera module 240 needs to be used and the functional assembly 20 needs to rotate to the outside of the receiving cavity 50, the rotational angle of the functional assembly 20 may be determined by the tilted angle of the camera module 240 with respect to the display screen 16. In this way, after the rotation, at least one side face of the camera module 240 may be parallel to the side face 160 at the top of the display screen 16.

In some embodiments, the rotational angle of the functional assembly 20 in a direction may be less than 180°, less than 90°, less than 45°, or less than 25°. For example, the rotational angle of the functional assembly 20 may be 10°, 15°, or 20°.

Figure 18:
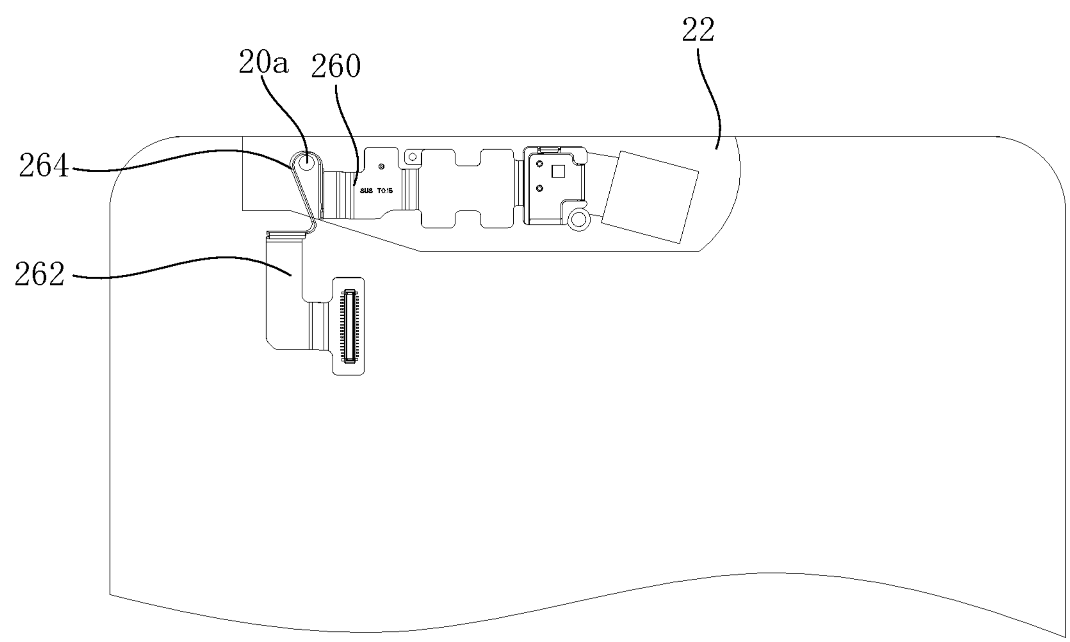
FIG. 18 is a schematic view illustrating a functional assembly at a first position according to an embodiment of the present disclosure.

As shown in FIG. 18, the flexible printed circuit board 26 connecting the functional component 24 with the main board may include a first fixing portion 260 fixed on the swinging member 22, a second fixing portion 262 fixed on the main board 80, and a movable portion 264 connected between the first fixing portion 260 and the second fixing portion 262. During rotation of the swinging member 22, a portion of the swinging member 22 that is closer to the rotational axis 20*a* may rotate along a circle for a shorter distance. That is, if a first portion of the swinging member 22 is located closer to the rotational axis 20*a* than a second portion of the swinging member 22, the first portion may be located in a first circle while the second portion may be located in a second circle, than the first circle may have a radius less than the second circle. Therefore, the movable portion 264 of the flexible printed circuit board 26 may be arranged adjacent to the rotational axis 20*a*. That is, the movable portion 264 may be arranged to surround the rotational axis 20*a*, in such a way that the rotational distance of the movable portion 264 may be reduced, and a length of the flexible printed circuit board 26 pulled by the swinging member 22 during the rotation of the swinging member 22 may also be reduced, such that the flexible printed circuit board 26 may be prevented to be torn apart.

As the first fixing portion 260 of the flexible printed circuit board 26 may rotate into and out of the receiving cavity 50 along the rotation of the swinging member 22, sealing foams may be provided on an outer surface of the flexible printed circuit board 26 to protect the flexible printed circuit board 26 from water and dust.

The rotation shaft 70 may be provided on the connection portion 224 of the swinging member 22. The camera module 240, the front flash 242, and the receiver 246 may all be arranged between the first end portion 220 and the rotation shaft 70. It should be understood that while the first end portion 220 of the swinging member 22 is rotating to the outside of the receiving cavity 50, the second end portion 222 may rotate along with the first end portion 220 in a direction away from the opening 14*a* of the body 10. That is, during the rotation of the second end portion 222, the second end portion 222 may gradually move away from the third side frame 144 of the middle frame 14, such that a gap may be defined between the third side frame 144 and the second end portion 222. According to an embodiment shown in FIG. 16 and FIG. 17, a distance between the rotation shaft 70 and the first end portion 220 may be greater than that between the rotation shaft 70 and the second end portion 222. Therefore, when the first end portion 220 rotates to the outside of the receiving cavity, with a same angular velocity, the first end portion 220 may rotate for a longer distance in a circle, and the second end portion 222 may rotate for a shorter distance in a circle, such that the gap between the second end portion 222 and the third side frame 144 may be reduced.

Figure 19:
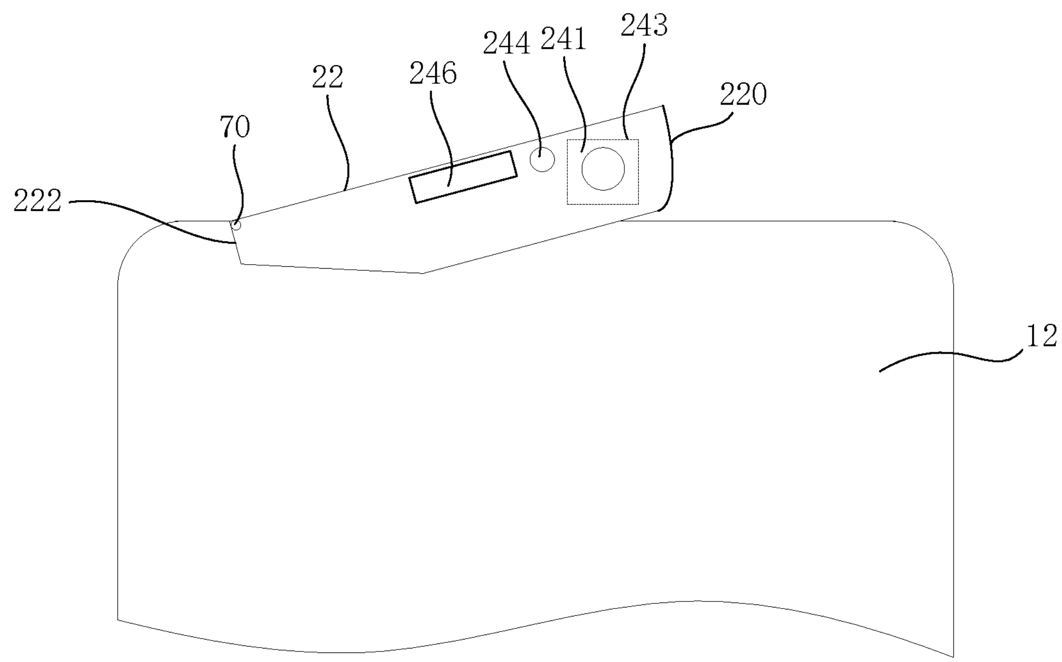
FIG. 19 is a schematic view illustrating a functional assembly at a second position according to another embodiment of the present disclosure.

In some other embodiments, as shown in FIG. 19, the rotation shaft 70 may be arranged at the second end portion 222 and at a position of the swinging member 22 close to the middle frame 14. Under such circumstance, the second end portion 222 may be disposed even closer to the rotation shaft 70, and the rotation shaft 70 may be disposed close to the third side frame 144 of the middle frame 14. Therefore, when the swinging member 22 is rotating, the rotation distance of the second end portion 222 in the circle may further be reduced, which may further reduce the gap between the second end portion 222 and the third side frame 144.

The above mentioned embodiments may provide the sliding mechanism formed by the sliding grooves engaging with the sliding blocks. However, in other embodiments, the sliding mechanism may include a sliding rail (such as protruded tracks) and a sliding element in other forms.

Figure 20:
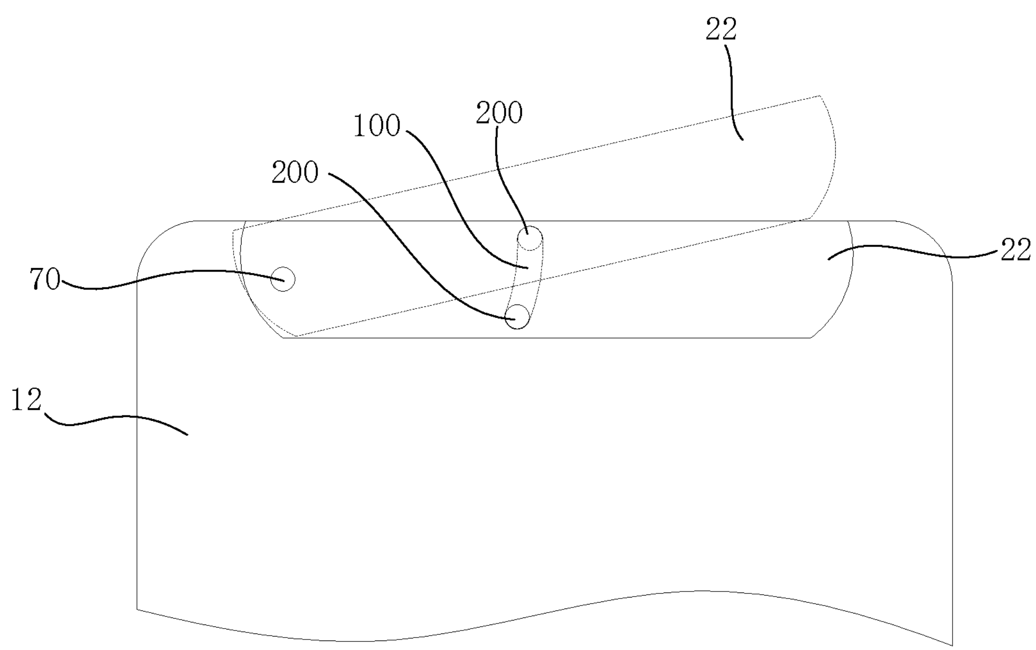
FIG. 20 is a schematic view illustrating a functional assembly at a first position and a second position according to still another embodiment of the present disclosure.

In some embodiments, as shown in FIG. 1, two sliding mechanisms may be provided. However, in some other embodiments, there may be one sliding mechanism. As shown in FIG. 20, the sliding groove 100 may be defined in the rear cover 12, and the sliding block 200 may be arranged on the swinging member 22.

According to the embodiments of the present disclosure, by providing sliding blocks 200 and 201 on the swinging member 22 and defining the sliding grooves 100 and 101 in the rear cover 12, and allowing the sliding blocks 200 and 201 to slide along the sliding grooves 100 and 101, the sliding blocks 200 and 201 may be guided in a direction, such that the swinging member 22 may be guided to rotate in a direction. The engagement between the rotation shaft 70 and the sliding mechanism may allow the swinging member 22 to rotate steadily. In other embodiments, three or more sliding mechanisms may be provided.

Figure 21:
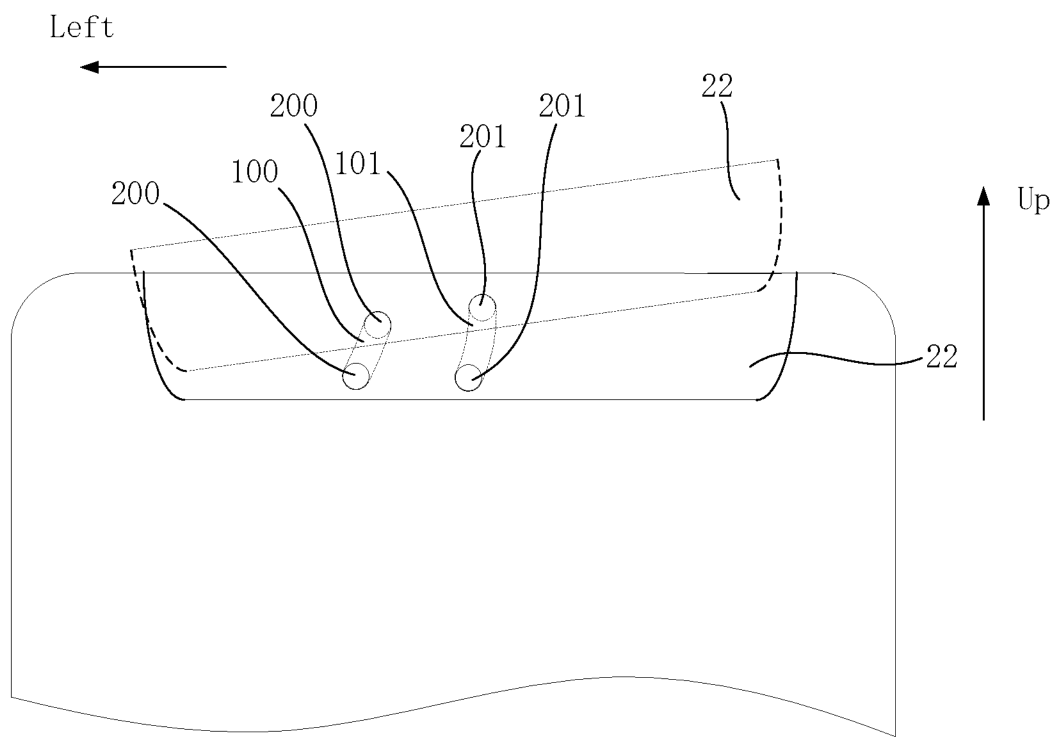
FIG. 21 is a schematic view illustrating a functional assembly at a first position and a second position according to yet another embodiment of the present disclosure.

It may be understood that, in some other embodiments, the swinging member 22 may be connected to the rear cover 12 but without the rotation shaft 70. Instead, the swinging member 22 may be connected to the rear cover 12 via at least two sliding mechanisms. According to an embodiment shown in FIG. 21, the swinging member 22 may be connected to the rear cover 12 via two sliding mechanisms. To be specific, the two sliding grooves 100 may both be defined in the rear cover 12, and the two sliding blocks 200 may both be arranged on the swinging member 22. The sliding blocks 200 may be arranged in and slide along the corresponding sliding grooves 100, such that the swinging member 22 may shift upwards and leftwards during rotation. In this way, a gap may not be defined between the second end portion 222 and the third side frame 144.

In some other embodiments, the swinging member 22 may also define a plurality of sliding grooves, and a plurality of sliding blocks may be arranged on the rear cover 12. Alternatively, some of the sliding grooves may be defined in the rear cover 12, and the sliding blocks engaged with the sliding grooves may be arranged on the swinging member 22; while other sliding grooves may be defined in the swinging member 22, and the sliding blocks engaged with the other sliding grooves may be arranged on the rear cover 12. The arrangement may not be limited by the present disclosure.

It may be understood that the sliding mechanism may not be only for a purpose of guiding, but also for position limit. When the functional assembly 20 rotates to the first position inside the receiving cavity 50, the sliding block 200 may abut against a side wall at an end of the sliding groove 100 that is away from the opening 14*a*, such that the functional assembly 20 may be prevented from rotating to a position further inside the mobile terminal. When the functional assembly 20 rotates from the first position to the second position outside the receiving cavity 50, the sliding block 200 may abut against a side wall at an end of the sliding groove 100 that is close to the opening 14*a*, such that the functional assembly 20 may be prevented from rotating to a position further out of the receiving cavity 50.

Of course, in some other embodiments, the swinging member 22 may be rotatably connected to the rear cover 12 through the rotation shaft 70, and a sliding mechanism may not be needed (as shown in FIG. 16 and FIG. 17).

Figure 22:
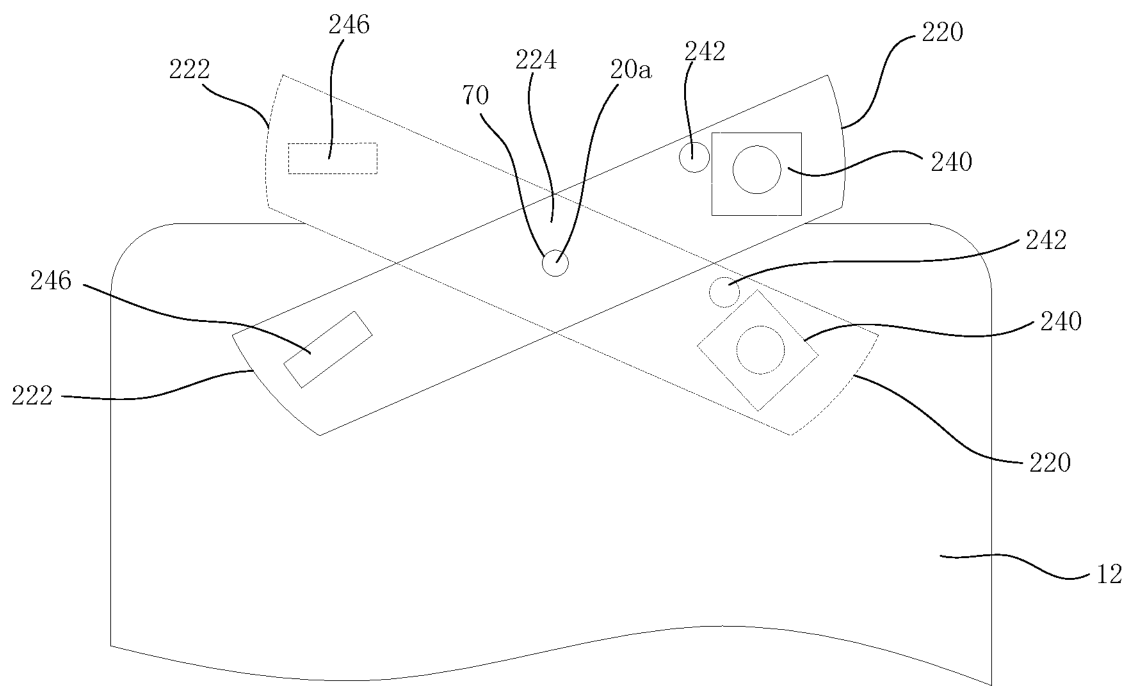
FIG. 22 is a schematic view illustrating a functional assembly at a first position and a third position according to an embodiment of the present disclosure.

As shown in FIG. 22, as described above, in some embodiments, the functional assembly 20 may rotate between the first position, the second position, and the third position. To be specific, the functional assembly 20 may rotate in a first direction from the first position to the second position, and may rotate in a second direction from the first position to the third position. The first direction may be an anti-clockwise direction, and the second direction may be a clockwise direction.

As shown in FIGS. 22 to 30, the rotational axis about which the functional assembly 20 rotates in the first direction may be the same as that about which the functional assembly 20 rotates in the second direction.

To be an example, as shown in FIG. 22, the connection portion 224 of the swinging member 22 may be rotatably connected to the rear cover 12 through the rotation shaft 70. In some embodiments, the rotation shaft 70 may be fixed with the rear cover 12. When the functional assembly 20 rotates in the first direction and the second direction, the rotational axes 20*a* on both occasions may be an axle center of the rotation shaft 70. In some embodiments, the camera module 240 and the front flash 242 may be arranged on a same side of the rotation shaft 70, and the receiver 246 may be arranged on an opposite side of the rotation shaft 70. When the swinging member 22 rotates in the first direction from the first position to the second position, the first end position 220 of the swinging member 22 may rotate to the outside of the receiving cavity 50, and the second end portion 222 may be located inside the receiving cavity 50. In this way, the camera module 240 and the front flash 242 may be exposed to the outside of the receiving cavity 50, and the receiver 246 may be positioned inside the receiving cavity 50. When the swinging member 22 rotates in the second direction from the first position to the third position, the second end portion 222 may rotate to the outside of the receiving cavity 50, and the first end portion 220 may be located inside the receiving cavity 50. In this way, the receiver 246 may be exposed to the outside of the receiving cavity 50, and the camera module 240 and the front flash 242 may be positioned inside the receiving cavity 50. According to some embodiments, the functional assembly 20 may rotate to protrude out of the receiving cavity 50 from two directions. Therefore, different functional components may be arranged on the two end portions of the swinging member 22. As the functional components are arranged at the end portions, when two functional components both need to be used, the swinging member 22 may rotate by a small angle to allow an easy operation.

Figure 23:
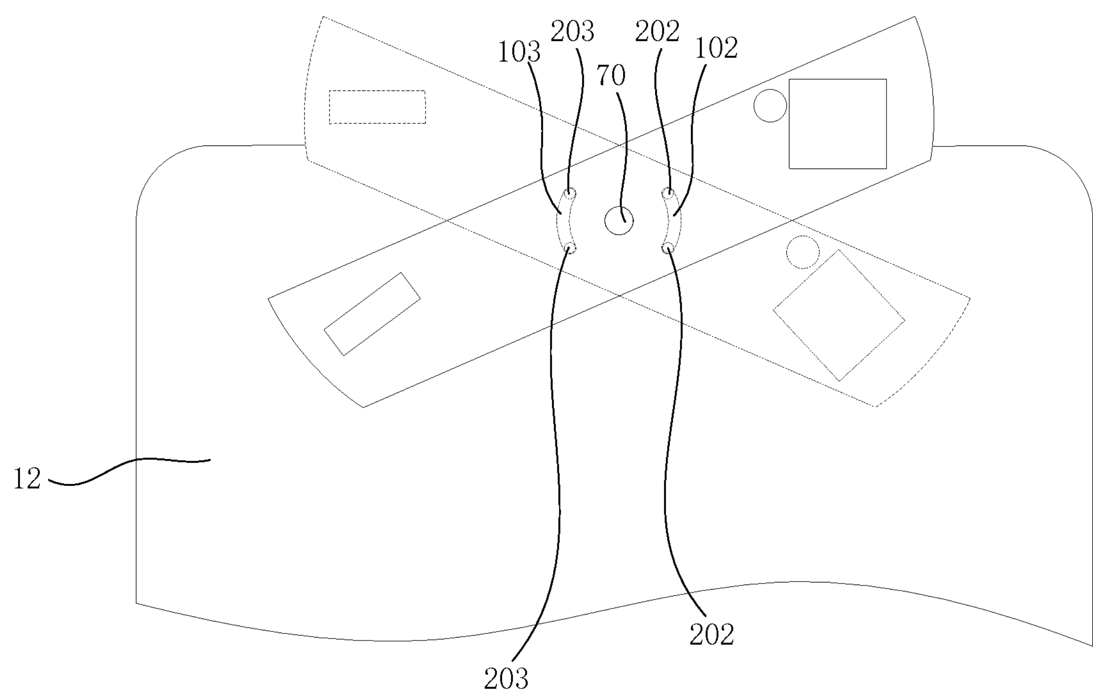
FIG. 23 is a schematic view illustrating a functional assembly at a first position and a third position according to another embodiment of the present disclosure.

In some embodiments, the sliding mechanism may be provided between the swinging member and the body. In some embodiments, as shown in FIG. 23, in case that the rotation shaft 70 is provided, two sliding mechanisms may also be provided at the same time. A first sliding groove 102 and a second sliding groove 103 of the two sliding mechanisms may both be defined in the rear cover 12. Each of the first sliding groove 102 and the second sliding groove 103 may be in shape of an arc. A center of the arc in which the first sliding groove 102 is located and a center of the arc in which the second sliding groove 103 is located may both lie on the axle center of the rotation shaft 70, and the first sliding groove 102 and the second sliding groove 103 may be arranged on two sides of the rotation shaft 70. The swinging member 22 may be provided with a first sliding block 202 and a second sliding block 203. The first sliding block 202 may be arranged within the first sliding groove 102 and slide along the sliding groove 102, and the second sliding block 203 may be arranged within the second sliding groove 103 and slide along the sliding groove 103.

Figure 24:
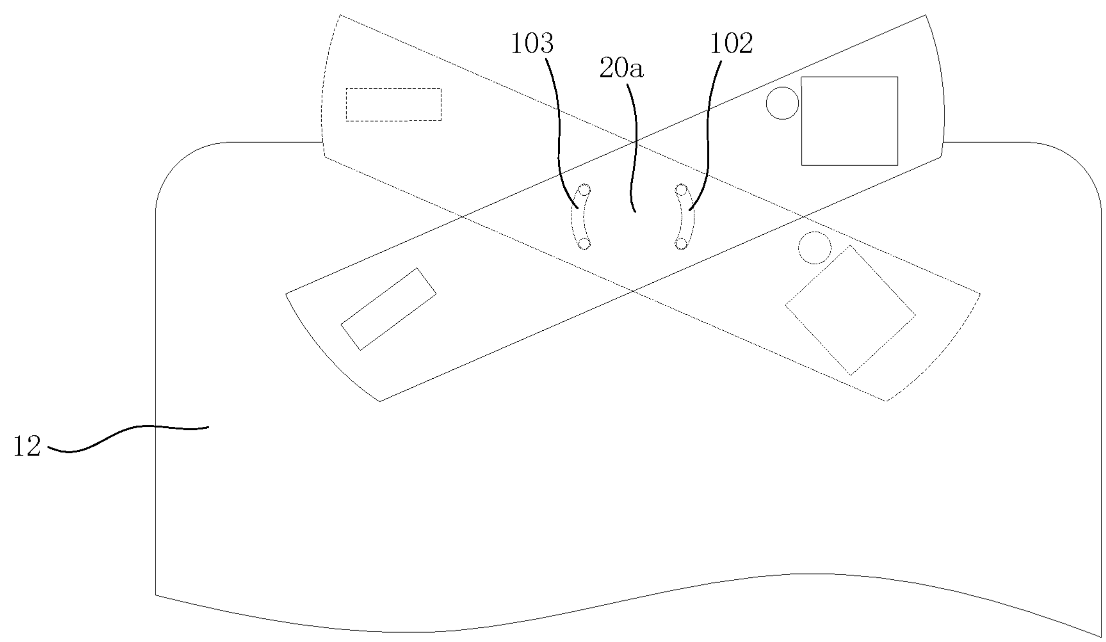
FIG. 24 is schematic view illustrating a functional assembly at a first position and a third position according to still another embodiment of the present disclosure.

As shown in FIG. 24, in some other embodiments, the swinging member 22 may be rotatably connected to the rear cover 12 through only two sliding mechanisms without the fixed rotation shaft. The center of the arc in which the first sliding groove 102 is located and the center in which the arc of the second sliding groove 103 is located may both lie on the rotational axis 20*a* of the swinging member 22, and the first sliding groove 102 and the second sliding groove 103 may be defined at two opposite sides of the rotational axis 20*a*.

The sliding mechanism may not only have a guiding function, but also have a function of position limit. To be specific, when the swinging member 22 rotates to the first position inside the receiving cavity 50, the first sliding block 202 may be positioned in a middle of the first sliding groove 102, and the second sliding block 203 may be positioned in a middle of the second sliding groove 103. When the swinging member 22 rotates in the first direction starting from the first position, the first sliding block 202 in the first sliding groove 102 may slide towards the opening 14*a* along the first sliding groove 102, and the second sliding block 203 in the second sliding groove 103 may slide away from the opening 14*a* along the second sliding groove 103. When the swinging member 22 reaches the second position, the first sliding block 202 may abut against the wall at an end of the first sliding groove 102 that is close to the opening 14*a*, and the second sliding block 203 may abut against the wall at an end of the second sliding groove 103 that is away from the opening 14*a*, such that the swinging member 22 may be prevented from rotating. Similarly, when the swinging member 22 rotates in the second direction starting from the first position, the first sliding block 202 in the first sliding groove 102 may slide away from the opening 14*a* along the first sliding groove 102, and the second sliding block 203 in the second sliding groove 103 may slide towards the opening 14*a* along the second sliding groove 103. When the swinging member reaches the third position, the first sliding block 202 may abut against the wall at an end of the first sliding groove 102 that is away from the opening 14*a*, and the second sliding block 203 may abut against the wall at an end of the second sliding groove 103 that is close to the opening 14*a*, such that the swinging member 22 may be prevented from rotating.

According to the above mentioned embodiments, when the functional assembly rotates in the first direction and the second direction to protrude out of the receiving cavity, the functional assembly may protrude from the same side frame of the middle frame 14. Under such circumstance, a position of the opening 14*a* of the middle frame 14 may be defined is shown as FIGS. 4 to 6.

In some other embodiments, when the swinging member 22 is arranged at the second position or the third position, the first end portion 220 may rotate to out of the receiving cavity 50, and the second end portion 222 may be disposed inside the receiving cavity 50.

Figure 7:
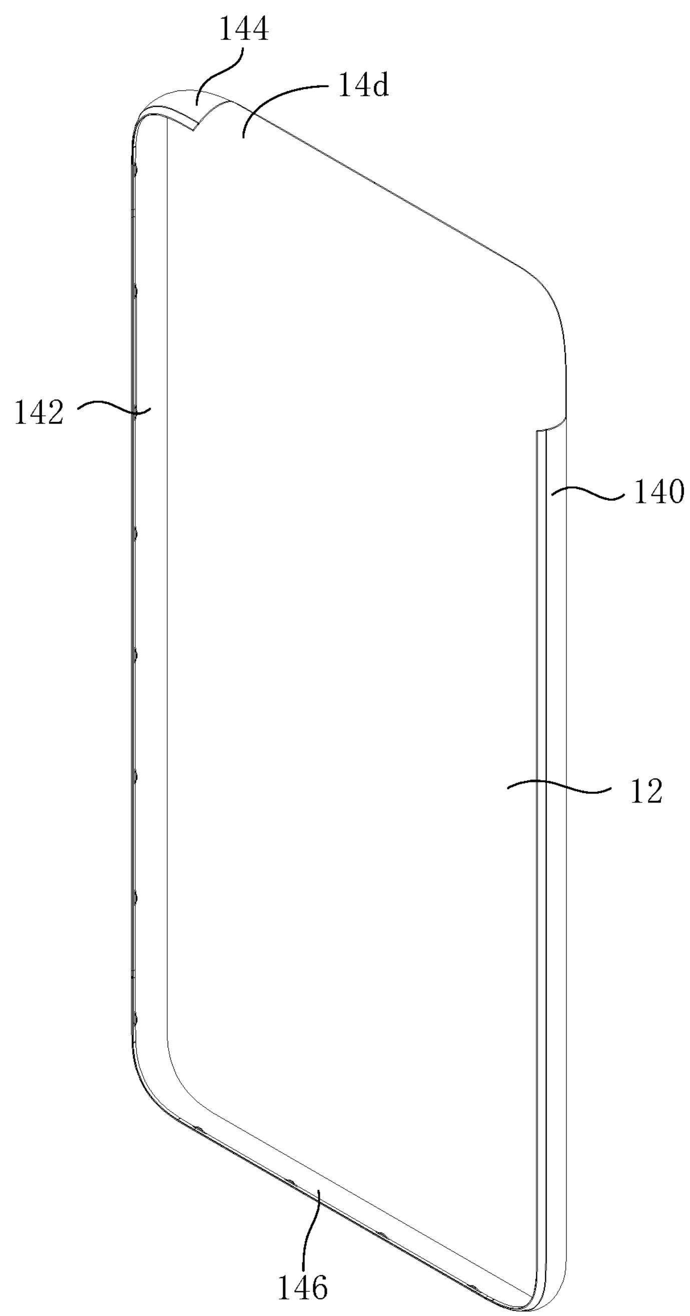
FIG. 7 is a perspective view of a middle frame of an electronic device according to still another embodiment of the present disclosure.
Figure 25:
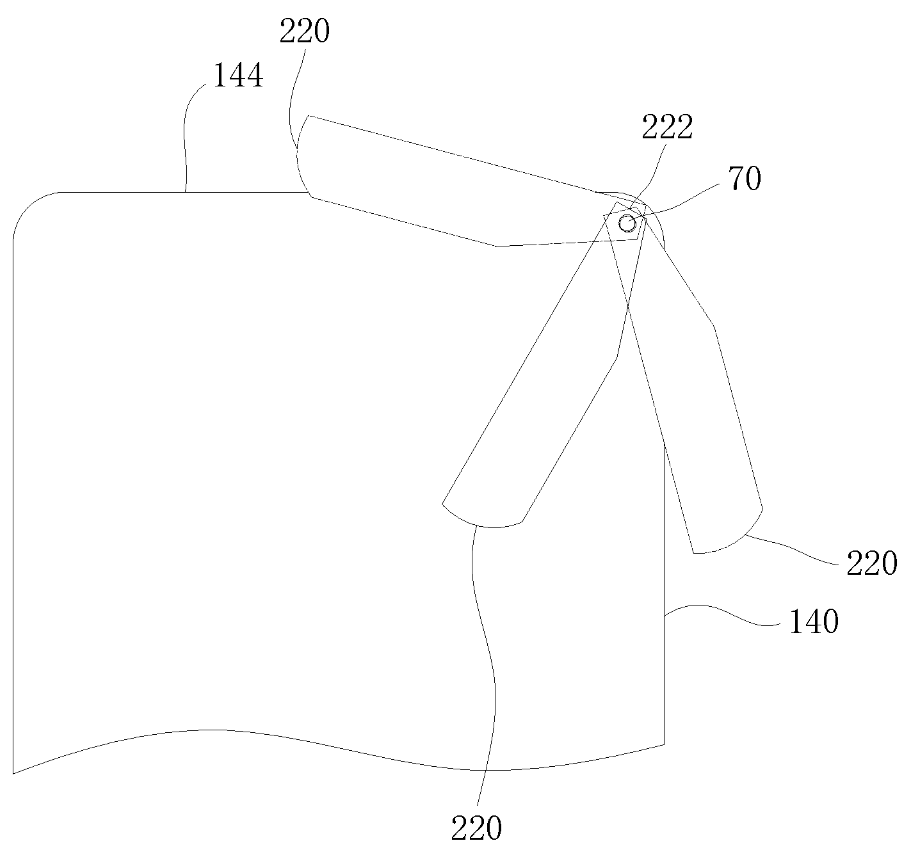
FIG. 25 is schematic view illustrating a functional assembly at a first position, a second position, and a third position according to still another embodiment of the present disclosure.
Figure 26:
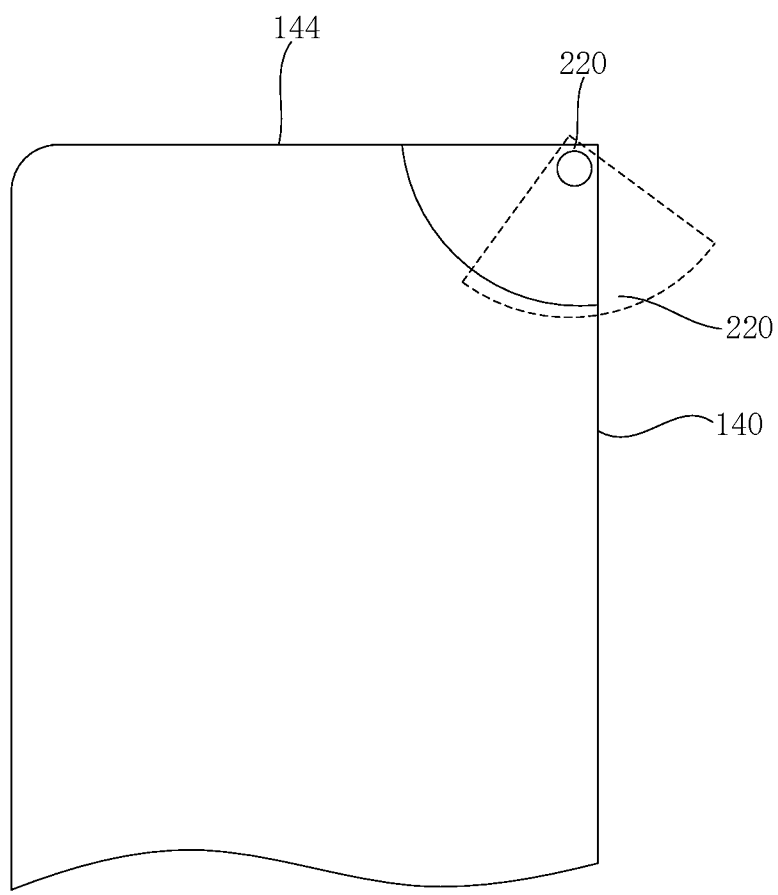
FIG. 26 is schematic view illustrating a functional assembly at a first position and a second position according to an embodiment of the present disclosure.
Figure 27:
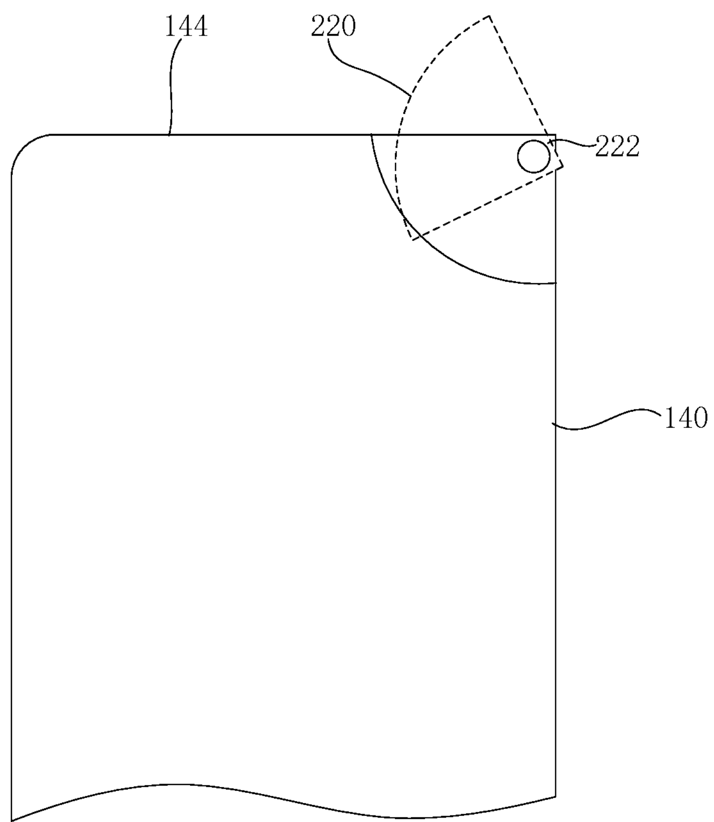
FIG. 27 is schematic view illustrating a functional assembly at a first position and a third position according to an embodiment of the present disclosure.
Figure 28:
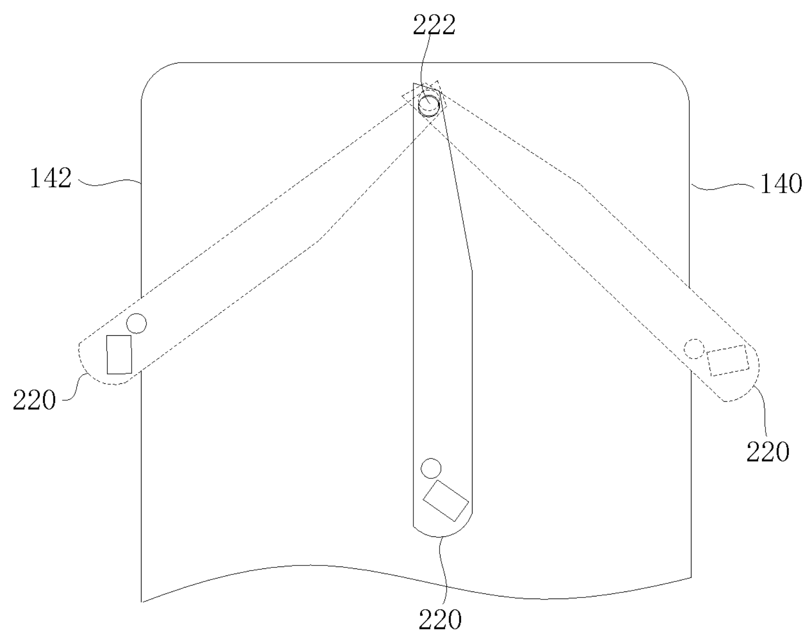
FIG. 28 is schematic view illustrating a functional assembly at a first position, a second position, and a third position according to still another embodiment of the present disclosure.

To be an example, as shown in FIG. 25, the second end portion 222 of the swinging member 22 may be rotatably connected to the rotation shaft 70. In some embodiments, the first side frame 140 and the third side frame 144, which are arranged adjacent to each other, may be disconnected to define an opening, as shown in FIG. 7. Under such circumstance, when the swinging member 22 rotates from the first position to the second position, the first end portion 220 may protrude to the outside from the first side frame 140. When the swinging member 22 rotates from the first position to the third position, the first end position 220 may protrude to the outside from the third side frame 144, which is adjacent to the first side frame 140. In some other embodiments, the swinging member 22 may be circular sector in shape, as shown in FIG. 26 and FIG. 27. When the swinging member 22 rotates from the first position to the second position, a side of the first end portion 220 may rotate to protrude from the first side frame 140 to be exposed out of the body 10, and an opposite side may remain inside the body 10. When the swinging member 22 rotates to reach the third position, a side of the first end portion 220 may remain inside the body 10, and an opposite side may rotate to protrude from the third side frame 144, which is adjacent to the first side frame 140, to be exposed out of the body 10.

Figure 9:
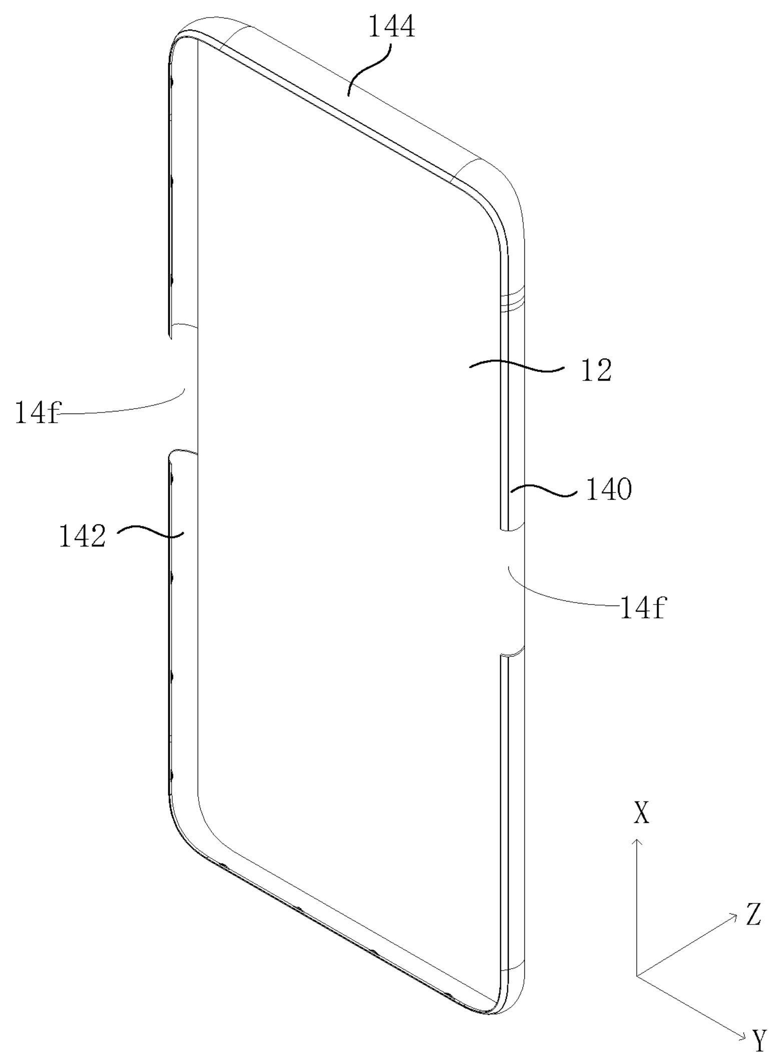
FIG. 9 is a perspective view of a middle frame of an electronic device according to still another embodiment of the present disclosure.

In some other embodiments, as shown in FIG. 9, the first side frame 140 may define an opening 14*f*, and the second side frame 142 opposite to the first side frame 140 may also define an opening 14*f*. Under such circumstance, when the swinging member 22 rotates from the first position to the second position, the first end portion 220 may rotate to protrude from the first side frame 140 of the middle frame 14. When the swinging member 22 rotates from the first position to the third position, the first end portion 220 may protrude from the second side frame 142, as shown in FIG.

Figure 29:
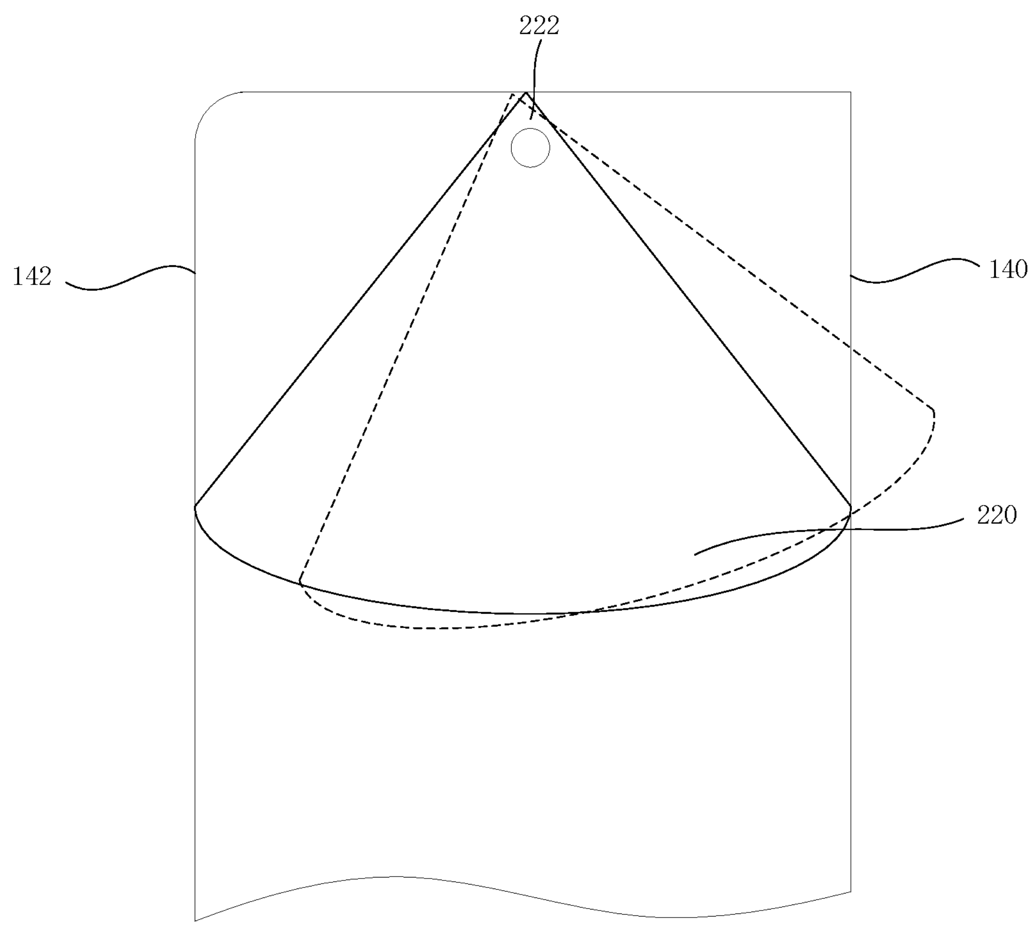
FIG. 29 is schematic view illustrating a functional assembly at a first position and a second position according to still another embodiment of the present disclosure.
Figure 30:
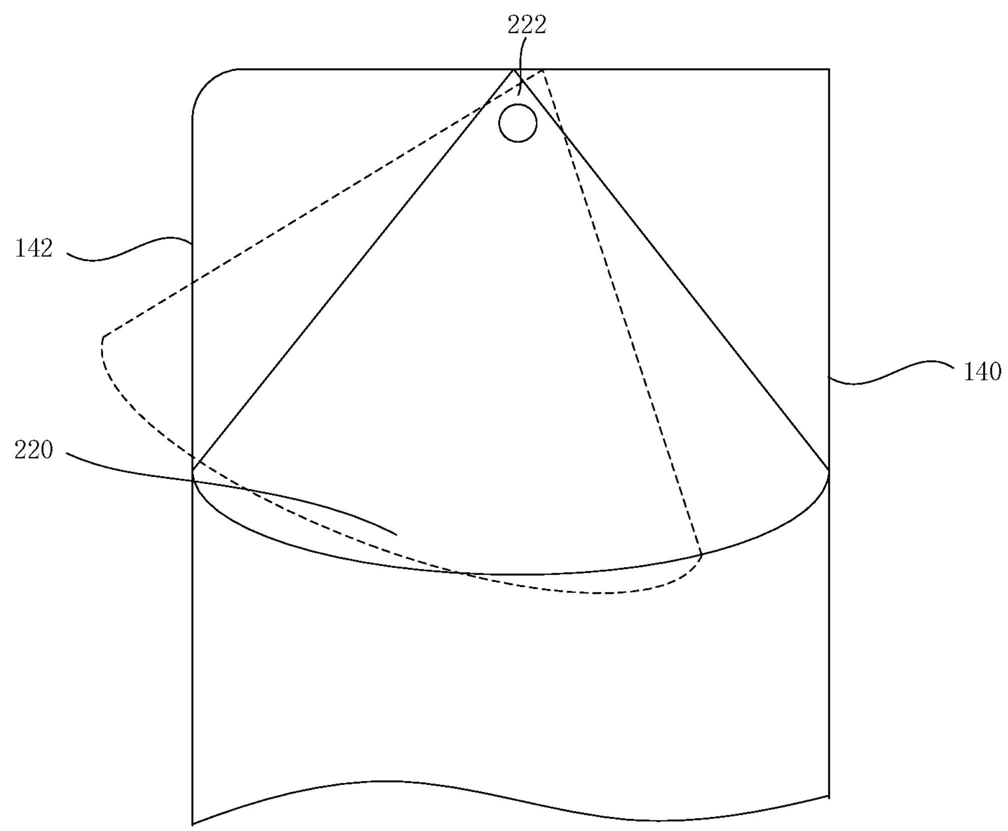
FIG. 30 is schematic view illustrating a functional assembly at a first position and a third position according to still another embodiment of the present disclosure.

28. In other embodiments, the swinging member 22 may be circular sector in shape, when the swinging member 22 is at the second position, a side of the first end portion 220 may protrude from the first side frame 140; and when the swinging member 22 is at the third position, an opposite side of the first end portion 220 may protrude from the second side frame 142, as shown in FIG. 29 and FIG. 30.

As shown in FIGS. 31 to 35, in some other embodiments, the rotational axis about which the functional assembly 20 rotates in the first direction may be different from that about which the functional assembly 20 rotates in the second direction.

Figure 31:
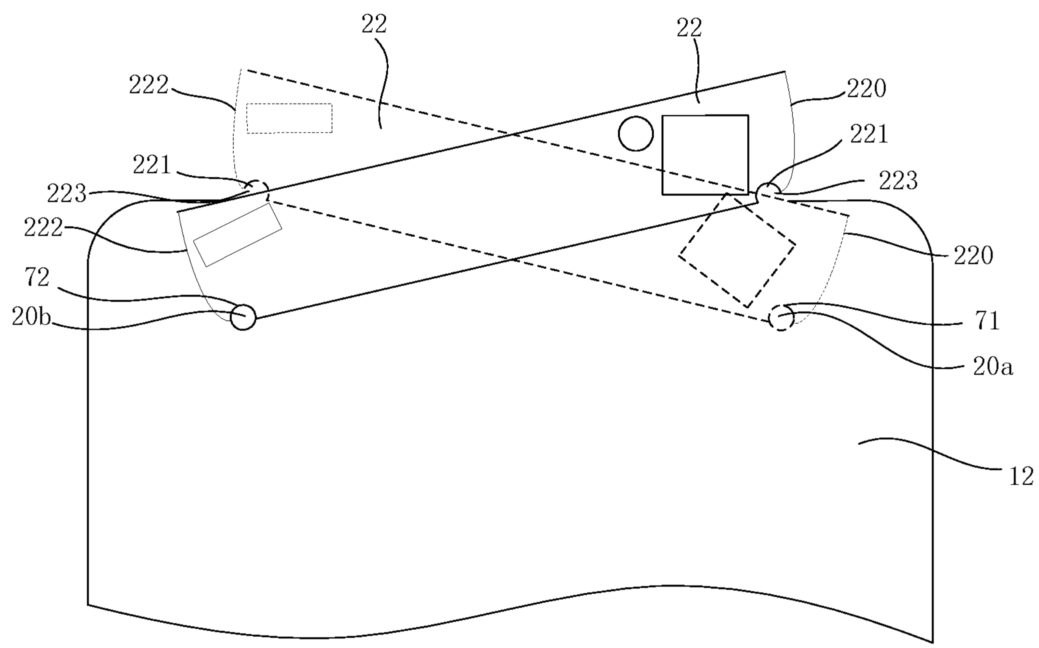
FIG. 31 is schematic view illustrating a functional assembly at a second position and a third position according to an embodiment of the present disclosure.

To be an example, as shown in FIG. 31, a first rotation shaft 71 and a second rotation shaft 72 may be fixed on the body 10, and the swinging member 22 may be rotatably connected to the rear cover 12 through the first rotation shaft 71 and the second rotation shaft 72. To be specific, when rotating in the first direction, the swinging member 22 may rotate around the second rotation shaft 71, the rotational axis 20*a* of the swinging member 22 may be an axle center of the second rotation shaft 72. When rotating in the second direction, the swinging member 22 may rotate around the first rotation shaft 71, on this occasion, a rotational axis 20*b* of the swinging member 22 may be an axle center of the first rotation shaft 71.

To be specific, each of the first end portion 220 and the second end portion 222 of the swinging member 22 may define a major arc shaped engaging recess 221, and the major arc shaped engaging recess 221 may have a recess opening 223. The first rotation shaft 71 and the second rotation shaft 72 could be engaged into the engaging recess 221, or detached from the engaging recess 221 through the recess opening 223. The first end portion 220 of the swinging member 22 may be engaged with the first rotation shaft 71 through the major arc shaped engaging recess 221 defined on the first end portion 220, and the second end portion 222 may be engaged with the second rotation shaft 72 through the major arc shaped engaging recess 221 defined on the second end portion 222.

A radius of the major arced engaging recess 221 may be slightly greater than or equal to a radius of the first rotation shaft 71 and a radius of the second rotation shaft 72, such that the first rotation shaft 71 and the second rotation shaft 72 may be engaged into the major arced engaging recess 221 to allow the swinging member 22 to rotate around the first rotation shaft 71 or the second rotation shaft 72. A width of the recess opening 223 of the engaging recess 221 may be smaller than the radius of the first rotation shaft 71 and the radius of the second rotation shaft 72, such that the first rotation shaft 71 and the second rotation shaft 72 may remain as being engaged inside the engaging recess 221 when no external force is applied. In some embodiments, some portions on two sides of the recess opening 223 of the major arced engaging recess 221 of the swinging member 22 may be made of an elastic material, such that the two sides of the recess opening 223 of the major arced engaging recess 221 may be deformed elastically to allow the first rotation shaft 71 and the second rotation shaft 72 to be engaged into the major arced engaging recess 221 through the recess opening 223 or to be detached from the major arced engaging recess 221 through the recess opening 223.

When the driving mechanism 30 applies a force to the first end portion 220 of the swinging member 22, and a direction of the force is opposite to a facing direction of the recess opening 223 of the major arced engaging recess 221 of the first end portion 220, the first end portion 220 of the swinging member 22 may be detached from the first rotation shaft 71, and the second end portion 72 may remain as rotatably connected with the second rotation shaft 72. Therefore, the swinging member 22 could rotate around the second rotation shaft 72, and the first end portion 220 could rotate to the outside of the receiving cavity 50, while the second end portion 222 may stay inside the receiving cavity 50.

When the driving mechanism 30 applies a force to the second end portion 222 of the swinging member 22, and a direction of the force is opposite to a facing direction of the recess opening 223 of the major arced engaging recess 221 of the second end portion 222, the second end portion 222 of the swinging member 22 may be detached from the second rotation shaft 72, and the first end portion 71 may remain as rotatably connected with the first rotation shaft 71. Therefore, the swinging member 22 could rotate around the first rotation shaft 71, and the second end portion 222 could rotate to the outside of the receiving cavity 50, while the first end portion 220 may stay inside the receiving cavity 50.

In some embodiments, a sliding mechanism may be provided between the swinging member 22 and the rear cover 12, such that a rotation of the swinging member 22 along an arc trajectory could be achieved through the engagement between the swinging member 22 and the first rotation shaft 71 and the engagement between the swinging member 22 and the second rotation shaft 72. The sliding mechanism may include a first sliding groove 104 and a second sliding groove 105 defined on the rear cover 12, and a sliding block arranged on the swinging member 22. Both the first sliding groove 104 and the second sliding groove 105 may have an arc shape.

Figure 32:
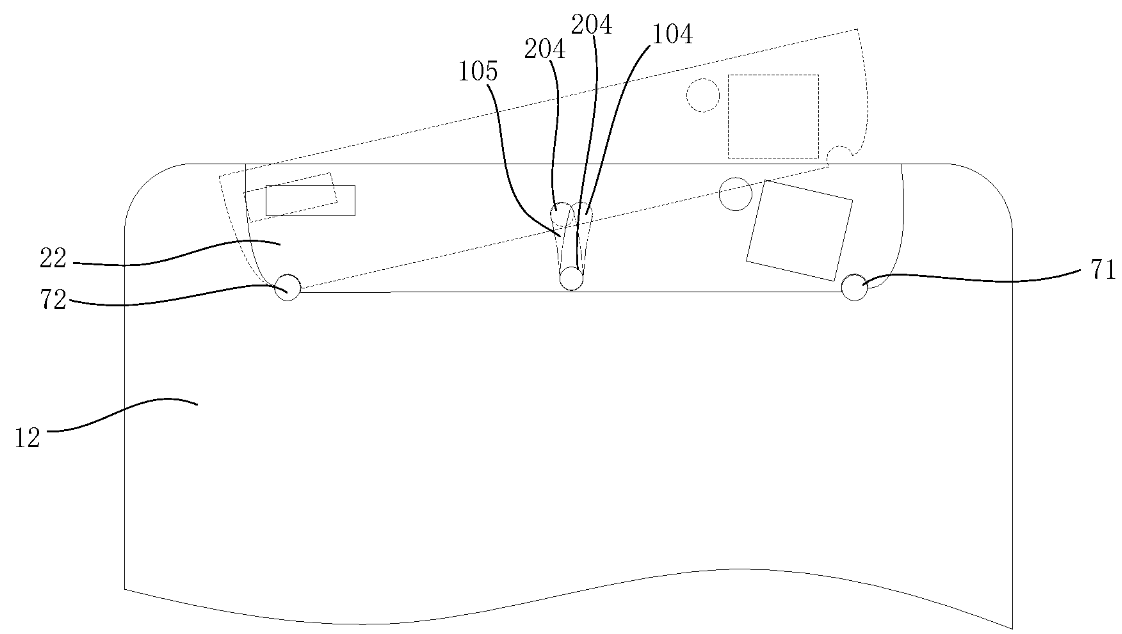
FIG. 32 is schematic view illustrating a functional assembly at a first position and a second position according to another embodiment of the present disclosure.
Figure 33:
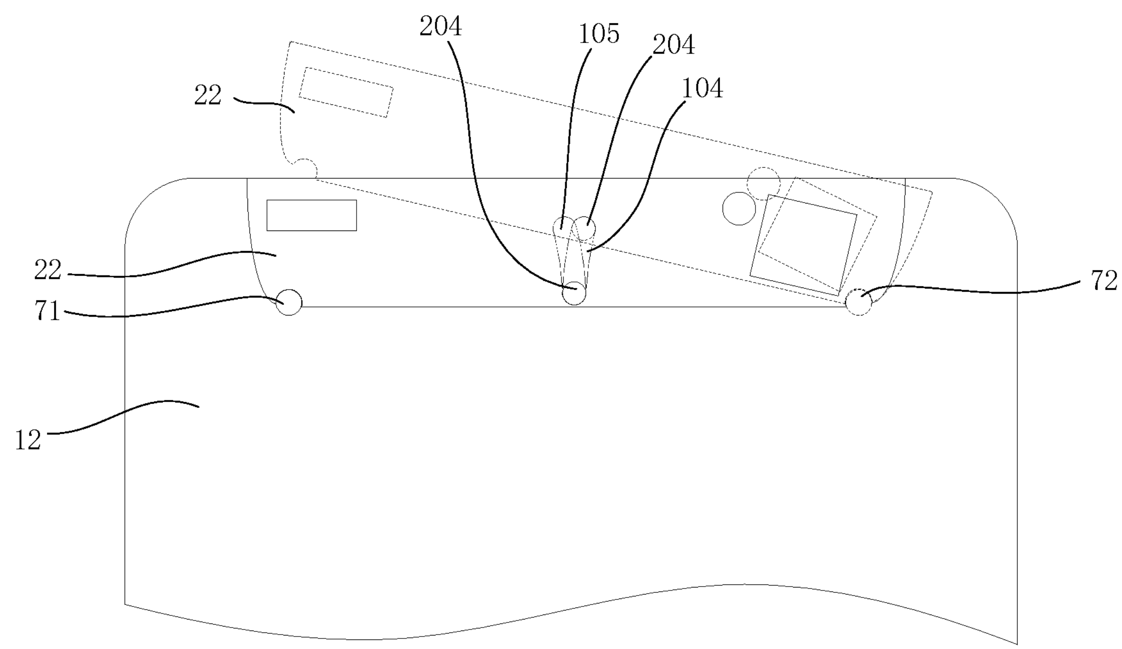
FIG. 33 is schematic view illustrating a functional assembly at a first position and a third position according to another embodiment of the present disclosure.

As shown in FIG. 32 and FIG. 33, a center of an arc in which the first sliding groove 104 is located may lie on an axle center of the first rotation shaft 71, and a center of the arc in which the second sliding groove 105 is located may lie on an axle center of the second rotation shaft 72. An end of the first sliding groove 104 away from the opening 14*a* of the middle frame 14 and an end of the second sliding groove 105 away from the opening 14*a* of the middle frame 14 may communicate with each other.

When the swinging member 22 rotates in the first direction to protrude out of the receiving cavity 50 from the first position, the sliding block 204 may slide along the second sliding groove 105. When the swinging member 22 rotates to the second position, the sliding block 204 may abut against a wall of an end of the second sliding groove 105 close to the opening 14*a* of the middle frame 14 to prevent the swinging member 22 from continuing rotating.

When the swinging member 22 rotates in the second direction to protrude out of the receiving cavity 50 from the first position, the sliding block 204 may slide along the first sliding groove 104. When the swinging member 22 rotates to the third position, the sliding block 204 may abut against a wall of an end of the first sliding groove 104 close to the opening 14*a* of the middle frame 14 to prevent the swinging member 22 from continuing rotating.

When the swinging member 22 rotates from the outside of the receiving cavity 50 to the first position inside the receiving cavity 50, the sliding block 204 may be positioned at an end of the first sliding groove 104 communicated with the second sliding groove 105, and the sliding block 204 may abut against a wall of the end of the first sliding groove 104 communicated with the second sliding groove 105, such that the swinging member 22 may be prevented from continuing rotating.

Figure 34:
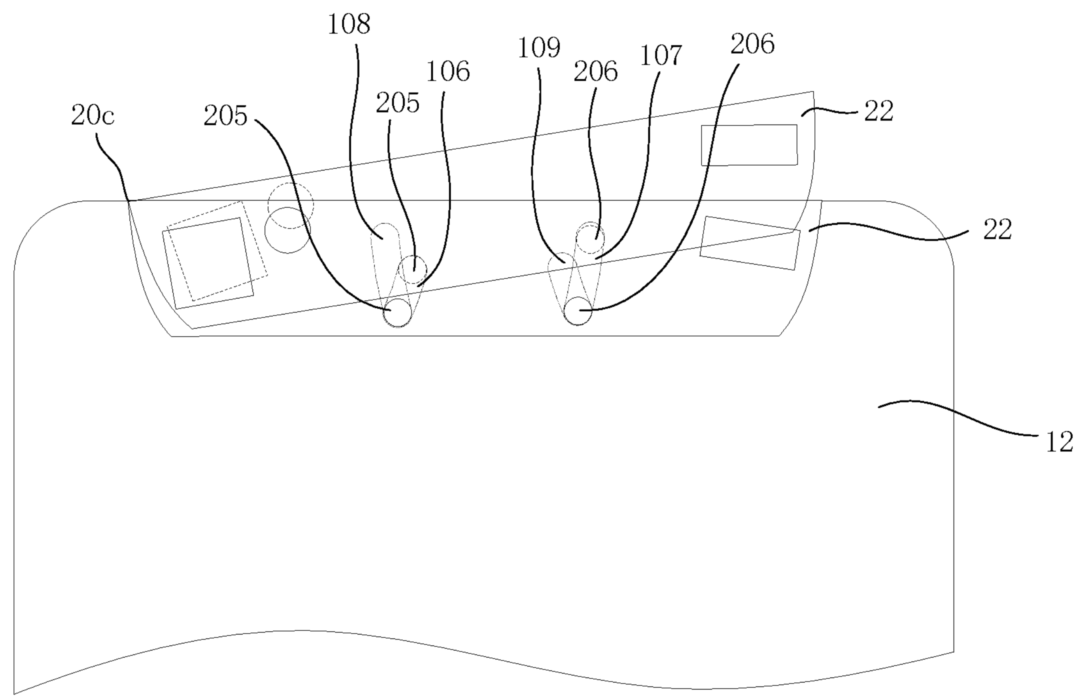
FIG. 34 is schematic view illustrating a functional assembly at a first position and a second position according to still another embodiment of the present disclosure.
Figure 35:
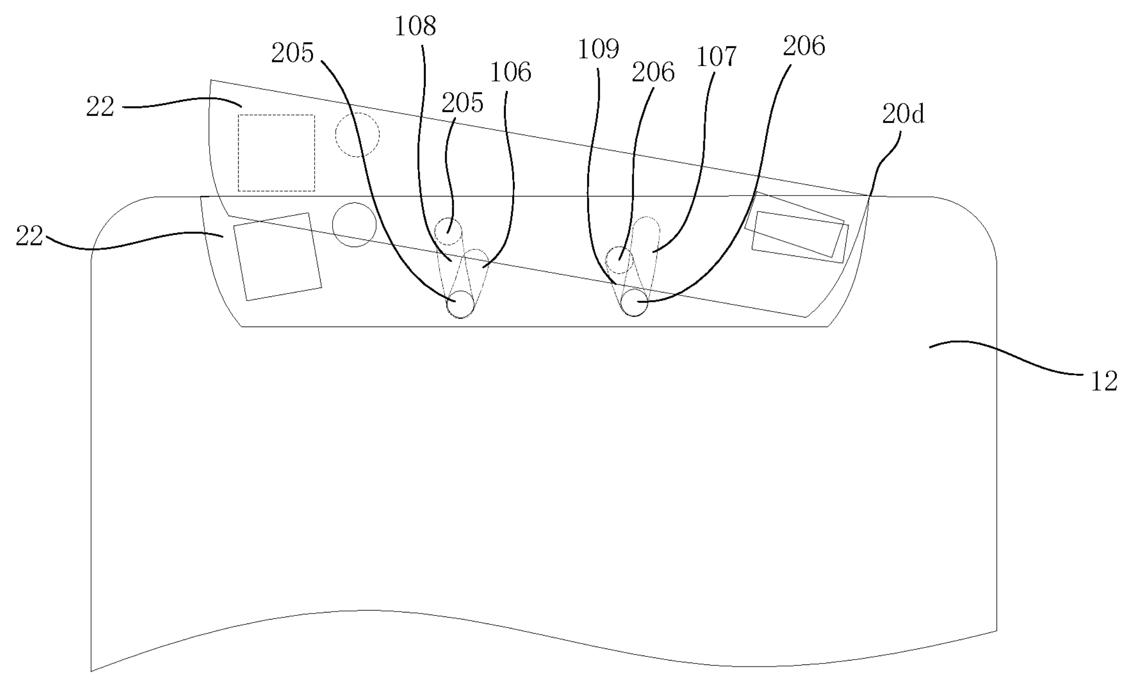
FIG. 35 is schematic view illustrating a functional assembly at a first position and a third position according to still another embodiment of the present disclosure.

As shown in FIG. 34 and FIG. 35, the functional assembly 20 and the body 10 may be simply rotatably connected through the sliding mechanism, and a fixedly arranged rotation shaft may not be needed.

To be specific, the sliding mechanism of the some embodiments may include a first sliding groove 106, a second sliding groove 107, a third sliding groove 108, a fourth sliding groove 109, a first sliding block 205 and a second sliding block 206. Each of the first sliding groove 106, the second sliding groove 107, the third sliding groove 108 and the fourth sliding groove 109 may have an arc shape, and be defined on the rear cover 12. Both of the first sliding block 205 and the second sliding block 206 may be provided on the swinging member 22.

A center of an arc in which the first sliding groove 106 is located and a center of an arc in which the second sliding groove 107 is located may lie on a rotational axis 20*c* of the swinging member 22 when the swinging member 22 rotates in the first direction. A center of an arc in which the third sliding groove 108 is located and a center of an arc in which the fourth sliding groove 109 is located may lie on a rotational axis 20*d* of the swinging member 22 when the swinging member 22 rotates in the second direction.

An end of the first sliding groove 106 away from the opening 14*a* of the middle frame 14 may communicate with an end of the third sliding groove 108 away from the opening 14*a* of the middle frame 14, and an end of the first sliding groove 106 close to the opening 14*a* of the middle frame 14 may be spaced from an end of the third sliding groove 108 close to the opening 14*a* of the middle frame 14. An end of the second sliding groove 107 away from the opening 14*a* may communicate with an end of the fourth sliding groove 109 away from the opening 14*a*, and an end of the second sliding groove 107 close to the opening 14*a* may be spaced from an end of the fourth sliding groove 109 close to the opening 14*a* of the middle frame 14.

When the swinging member 22 rotates in the first direction to protrude out of the receiving cavity 50 from the first position, the first sliding block 205 may slide inside and along the first sliding groove 106, and the second sliding block 206 may slide inside and along the second sliding groove 107. When the swinging member 22 reaches the second position, the first sliding block 205 may abut against the end of the first sliding groove 106 close to the opening 14*a* of the middle frame 14, and the second sliding block 206 may abut against the end of the second sliding groove 107 close to the opening 14*a* of the middle frame 14, such that the swinging member 22 may be prevented from rotating.

When the swinging member 22 rotates in the second direction to protrude out of the receiving cavity 50 from the first position, the first sliding block 205 may slide inside and along the third sliding groove 108, and the second sliding block 206 may slide inside and along the fourth sliding groove 109. When the swinging member 22 reaches the third position, the first sliding block 205 may abut against the end of the third sliding groove 108 close to the opening 14*a* of the middle frame 14, and the second sliding block 206 may abut against the end of the fourth sliding groove 109 close to the opening 14*a* of the middle frame 14, such that the swinging member 22 may be prevented from rotating.

When the swinging member 22 rotates from the outside of the receiving cavity 50 to the first position inside the receiving cavity 50, the first sliding block 205 may abut against a wall of the end of the first sliding groove 106 communicated with the third sliding groove 108, and the second sliding block 206 may abut against a wall of the end of the second sliding groove 107 communicated with the fourth sliding groove 109, such that the swinging member 22 may be prevented from rotating.

Figure 36:
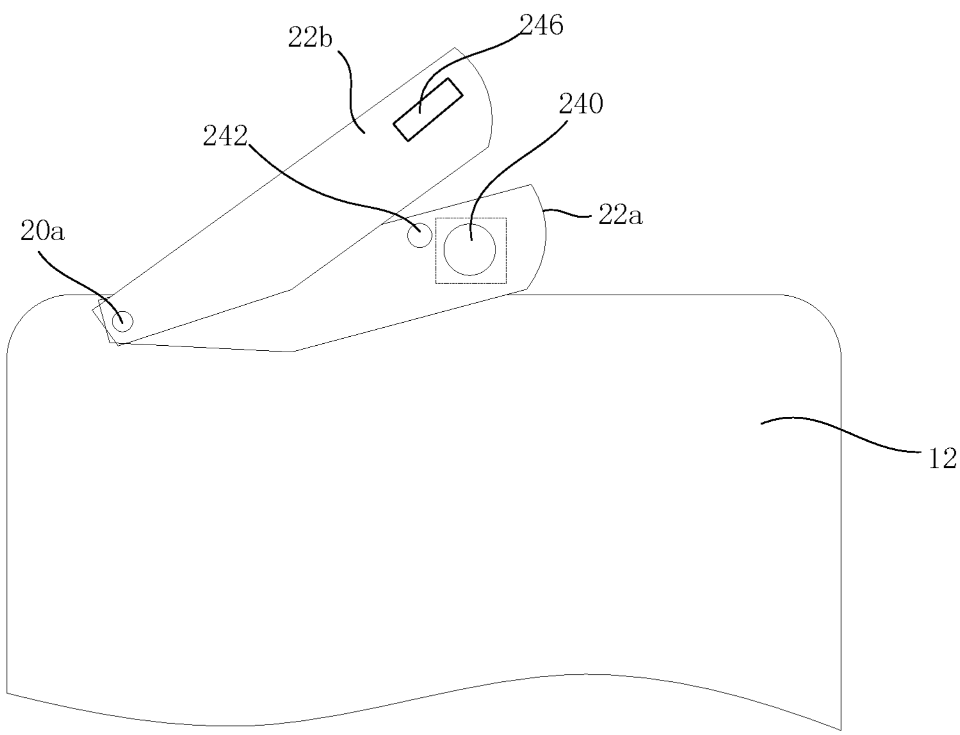
FIG. 36 is schematic view illustrating a plurality of functional assemblies at a second position according to an embodiment of the present disclosure.
Figure 37:
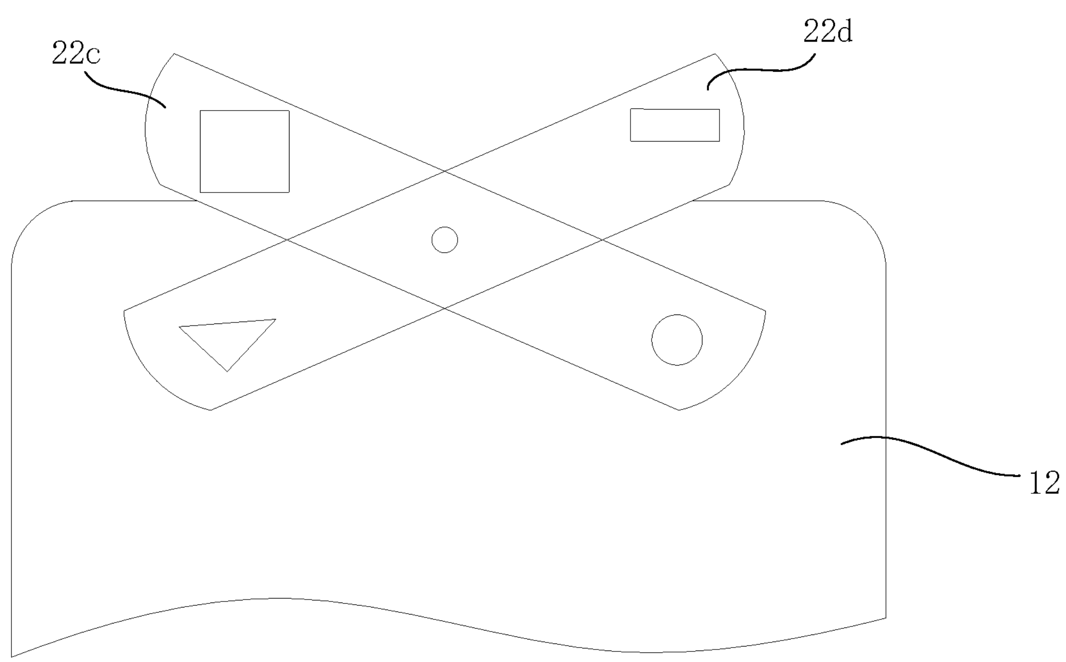
FIG. 37 is schematic view illustrating a plurality of functional assemblies at a second position and a third position respectively, according to another embodiment of the present disclosure.

As shown in FIG. 36 and FIG. 37, in some embodiments, a plurality of the functional assemblies 20 may be provided, and each of the plurality of functional assemblies 20 may include at least one functional component. For example, in FIG. 36, functional components 24 arranged on a swinging member 22*a* may include a camera module 240 and a front flash 242. A functional component 24 arranged on another swinging member 22*b* may include a receiver 246. In some embodiments, rotational axis 20*a* of each functional assembly 20 may be overlapped. When one of the functional components needs to be used, the driving mechanism 30 may drive the swinging member 22, which is provided with the corresponded functional component, to rotate to protrude out of the receiving cavity 50. For example, when the camera module 240 is needed, the driving mechanism 30 may drive the swinging member 22*a*, which is provided with the camera module 240, to rotate to the outside of the receiving cavity 50, such that the camera module 240 may rotate to protrude out of the receiving cavity 50. When the receiver 246 is needed, the driving mechanism 30 may drive the swinging member 22*b*, which is provided with the receiver 246, to rotate to the outside of the receiving cavity 50, such that the receiver 246 may protrude out of the receiving cavity 50.

It may be understood that, in some embodiments, the plurality of the functional assemblies 20 may have unoverlapped different rotational axes 20*a*, and the plurality of the functional assemblies 20 may be arranged at different positions. For example, functional assemblies 20 corresponding to the camera module, the flash, and the receiver may be arranged on a top of the mobile terminal, and the functional assembly 20 corresponding to a microphone may be arranged at a bottom of the mobile terminal.

Figure 38:
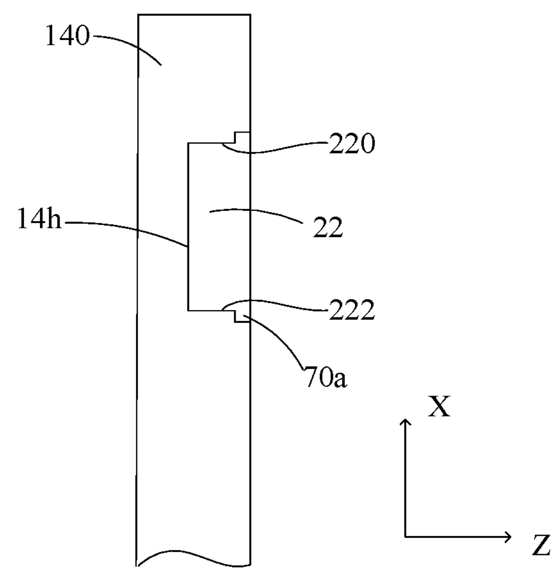
FIG. 38 is schematic view illustrating a plurality of functional assemblies at a second position according to another embodiment of the present disclosure.
Figure 39:
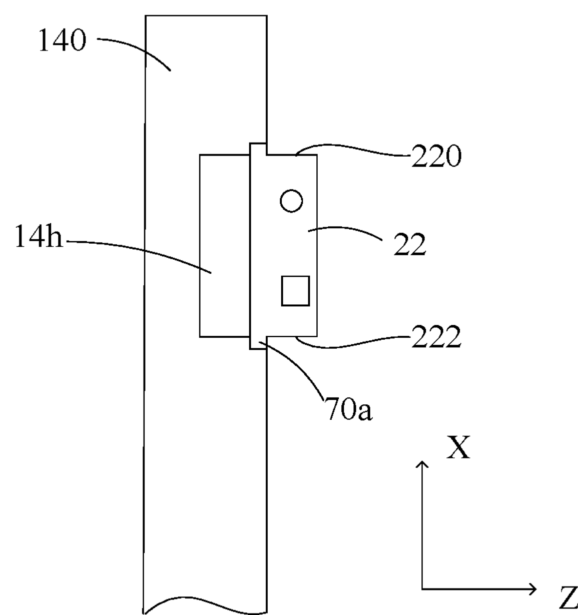
FIG. 39 is schematic view illustrating a plurality of functional assemblies at a second position and a third position respectively, according to still another embodiment of the present disclosure.

It may be understood that, in some other embodiments, an axis of the rotation shaft may extend along a length direction of the mobile terminal. As shown in FIG. 38 and FIG. 39, in some embodiments, each of the first end portion 220 and the second end portion 222 of the swinging member 22 may be provided with a rotation shaft 70*a*. An opening 14*h* extending along the length direction X may be defined on the first side frame 140 of the middle frame 14. A side wall defining the opening may define a receiving hole along the length direction X to fit with the rotation shaft, such that the swinging member 22 may be rotatably connected to the middle frame 14 of the body 10 by an engagement between the rotation shaft and the receiving hole. On this occasion, the swinging member 22 may rotate by flipping.

In some embodiments, the driving mechanism 30 may include a power assembly 32 fixed on the body, a transmission assembly 34 connected with the power assembly 32 in a transmission manner, and a pushrod assembly 36 connected between the transmission assembly 34 and the swinging member 22. The pushrod assembly 36 may be arranged to push the functional assembly 20 to rotate (as shown in FIG. 12 and FIG. 13).

To be specific, the power assembly 32 may be a motor, a cylinder, hydraulic cylinder, or the like. The power assembly 32 may be a motor 320 and a gear box 322 connected with an output shaft of the motor 320.

The transmission assembly 34 may include a screw 340, a guide rod 342 and a connection element 344. The screw 340 and the guide rod 342 may be arranged alongside in parallel. An output end of the gear box 322 may be connected with the screw 340 to drive the screw 340 to rotate. An end of the connection element 344 may define a screw hole and a through hole. The screw 340 may be threaded into the screw hole to achieve a thread connection between the connection element 344 and the screw 340, such that rotation of the screw 340 may drive the connection element 344 to move along the screw 340. The guide rod 342 may be inserted into the through hole to guide a moving direction of the connection element 344. Another end of the connection element 344 may be connected with an end of the pushrod assembly 36.

Another end of the pushrod assembly 36 may extend through the through hole 147 defined on the partition board 145 and the seal ring 60 inside the through hole 147, such that the pushrod assembly 36 may protrude from the second receiving space 54 to the first receiving space 52 to be connected to the functional assembly 20. To be specific, the pushrod 36 may include a pushrod 360, a spring 362 provided to surround a periphery of the pushrod 360, and a sleeve 364 to encase the pushrod 360 and the spring 362. The spring 362 may be arranged between and abut against the connection element 344 and the sleeve 364. The sleeve 364 may include a top wall and a side wall connected to the top wall. The top wall of the sleeve 364 may cover an end of the pushrod 360 and an end of the spring 362 close to the swinging member 22, and the side wall of the sleeve 364 may cover at least partial periphery of the pushrod 360 and the spring 362, such that the portion of the pushrod 360 and the portion of the spring 362, which are protruded into the first receiving space 52, may be sealed by the sleeve 364, and the pushrod 360 and the spring 362 may be sealed for protection. The seal ring 60 may be sealed and sleeved outside the sleeve 364, such that the first receiving space 52 and the second receiving space 54 may be sealed and isolated.

The sleeve 364 may be provided with a guide track 366, and the swinging member 22 may be provided with a guide block 228, which may be placed inside the guide track 366. When the swinging member 22 rotates, the guide block 228 may slide inside and along the guide track 366. The sleeve 364 may abut against the guide block 228 to support the swinging member 22, so as to drive the swinging member 22 to rotate.

Figure 40:
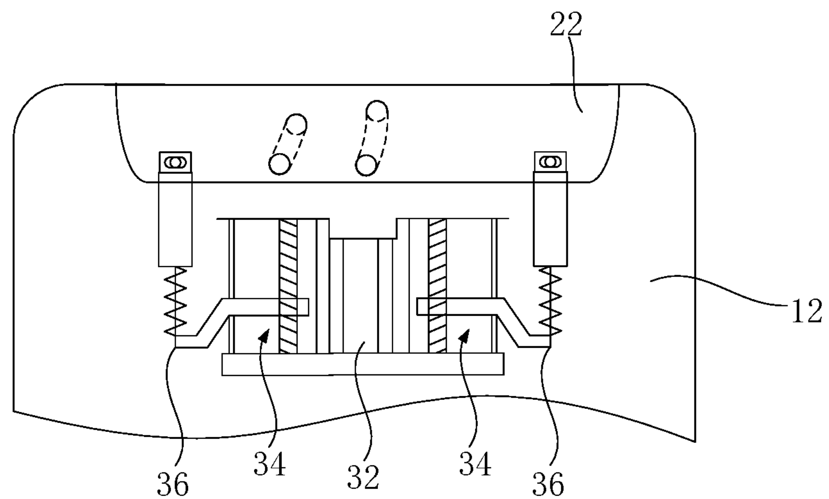
FIG. 40 is a schematic view illustrating a driving mechanism and a swinging member according to an embodiment of the present disclosure.

In other embodiments, there may be a plurality of the pushrod assemblies 36 and a plurality of the transmission assemblies 34. The plurality of the pushrod assemblies 36 may be arranged with distance apart from each other, and the plurality of the transmission assemblies 34 may be arranged with distance apart from each other. As shown in FIG. 40, two pushrod assemblies 36 may be arranged at two sides of the power assembly 32 respectively, and two transmission assemblies 34 may be arranged at two sides of the power assembly 32 respectively.

Figure 41:
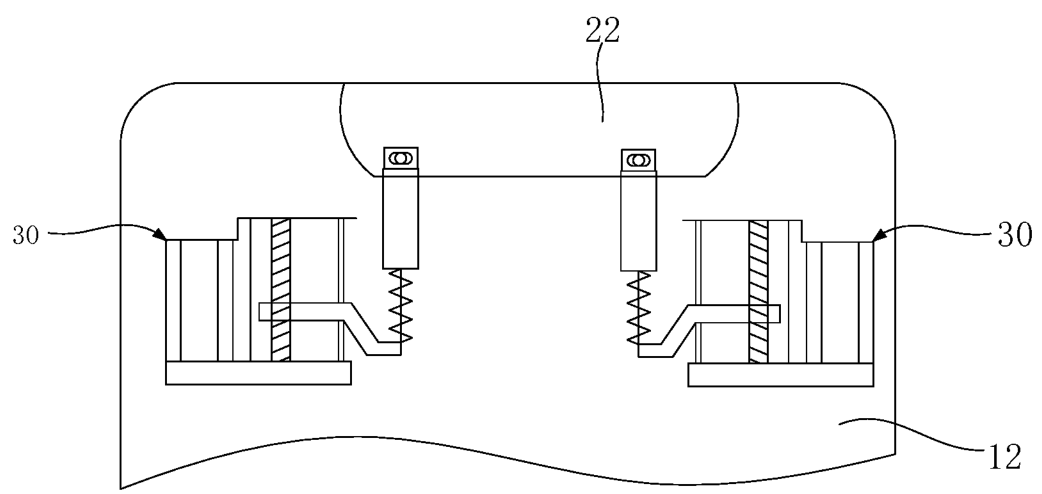
FIG. 41 is a schematic view illustrating a driving mechanism and a swinging member according to another embodiment of the present disclosure.

As shown in FIG. 41, in some embodiments, there may be two the driving assemblies 30 arranged with distance apart from each other.

Figure 42:
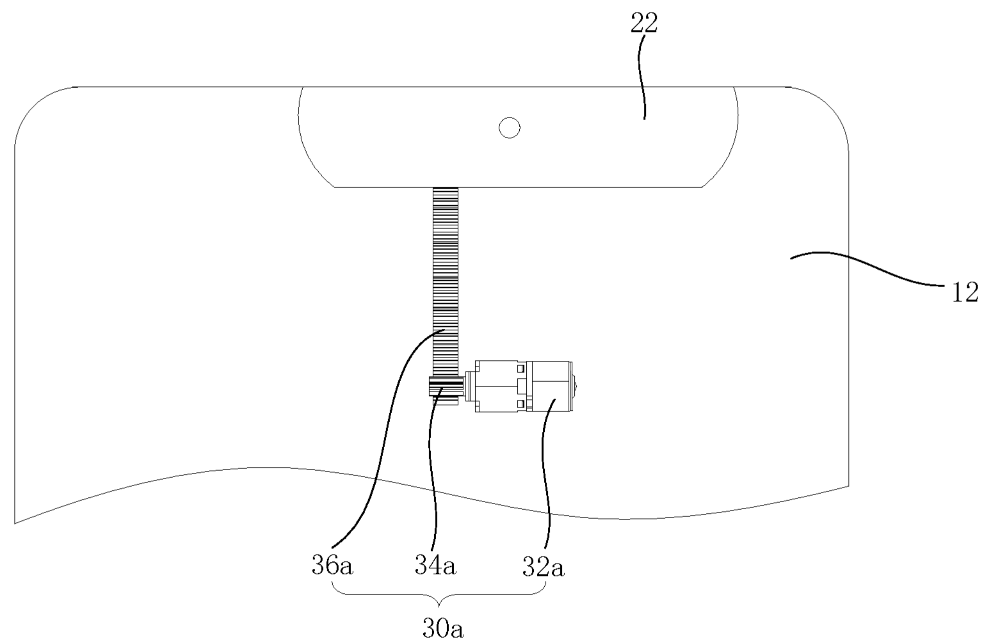
FIG. 42 is a schematic view illustrating a driving mechanism and a swinging member according to still another embodiment of the present disclosure.

As shown in FIG. 42, in some embodiments, a driving assembly **30*a* may include a motor 32*a* fixed on the rear cover 12, a gear 34*a* connected with an output shaft of the motor 32*a*, and a gear rack 36*a* fixed inside the body 10 extending along a predefined direction. An end of the gear rack 36*a* may engage with the gear 34*a*, and another end of the gear rack 36*a* may be connected to the swinging member 22. The motor 32*a* may drive the gear 34*a* to rotate to further drive the gear rack 36*a* to reciprocate along the predefined direction, the reciprocating of the gear rack 36*a* may drive the swinging member 22** to rotate.

Figure 43:
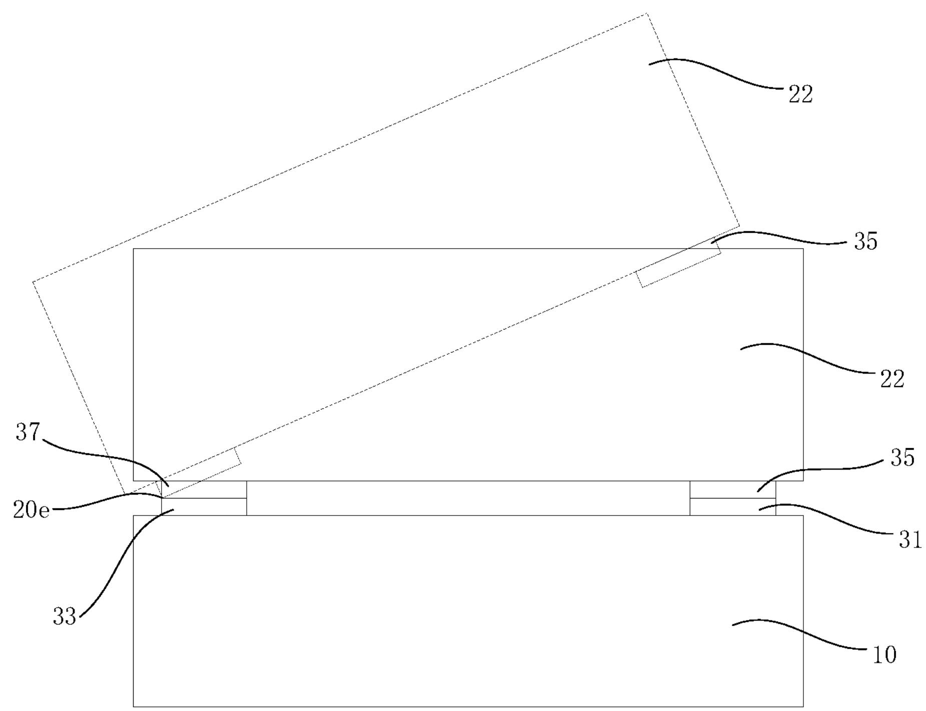
FIG. 43 is a schematic view illustrating a driving mechanism and a swinging member according to yet another embodiment of the present disclosure, wherein the swinging member is at a second position.
Figure 44:
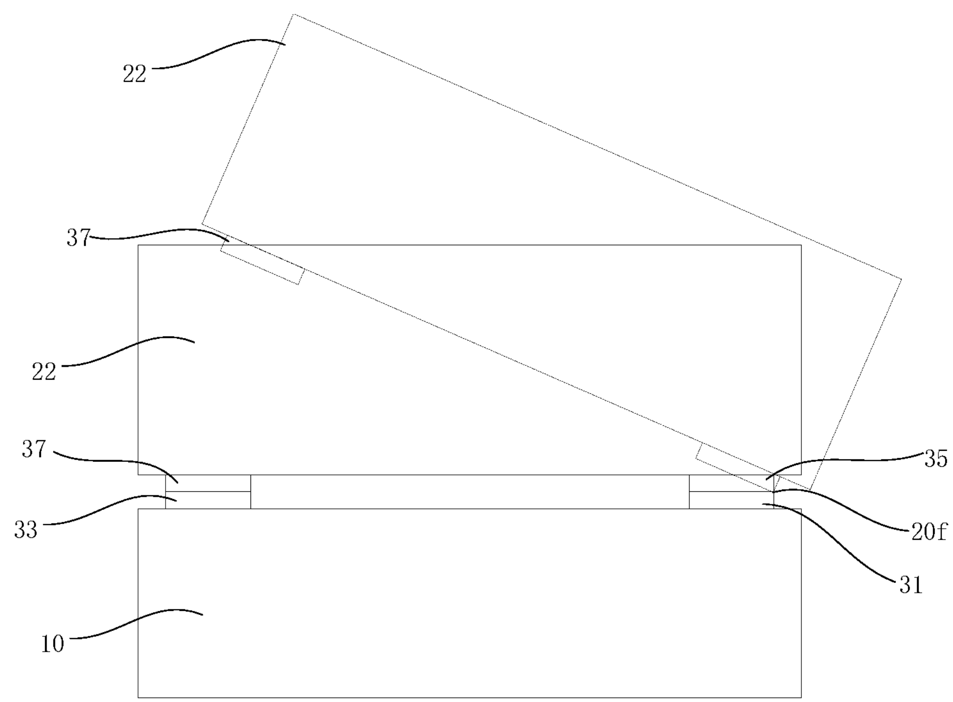
FIG. 44 is a schematic view illustrating a driving mechanism and a swinging member according to still another embodiment of the present disclosure, wherein the swinging member is at a third position.

In some other embodiments, as shown in FIG. 43 and FIG. 44, the driving mechanism may include a first magnet 31 and a second magnet 33, which are arranged on the body 10 with distance apart from each other, and a third magnet

35 and a fourth magnet 37, which are arranged on the swinging member 22 with distance apart from each other. The third magnet 35 may be arranged with respected to the first magnet 31, and the fourth magnet 37 may be arranged with respected to the second magnet 33. On this occasion, the swinging member 22 may be connected to the body 10 without a fixed rotation shaft.

When the first magnet 31 repels the third magnet 35, and the second magnet 33 attracts the fourth magnet 37, the swinging member 22 may rotate in the first direction, and a rotational axis **20*e* may be positioned at a connection between the second magnet 33 and the fourth magnet 37**.

When the first magnet 31 attracts the third magnet 35, and the second magnet 33 repels the fourth magnet 37, the swinging member 22 may rotate in the second direction, and a rotational axis **20*f* may be positioned at a connection between the first magnet 31 and the third magnet 35**.

The first magnet 31 and the second magnet 33 may both be electromagnets, magnetic poles of the first magnet 31 and those of the second magnet 33 may be reversed by changing the electric current. Of course, the third magnet 35 and the fourth magnet 37 may also be electromagnets. Alternatively, the first, the second, the third, and the fourth magnets 31, 33, 35, and 37 may all be permanent magnets, on this occasion, directions of the magnetic poles may be changed by rotating the magnets.

It may be understood that, in some other embodiments, the third magnet 35 and the fourth magnet 37 may maintain in a state of mutual attraction, such that the swinging member 22 may rotate in one direction only.

In addition to automatically controlling the rotation of the swinging member 22, manual controlling may also be available.

Figure 45:
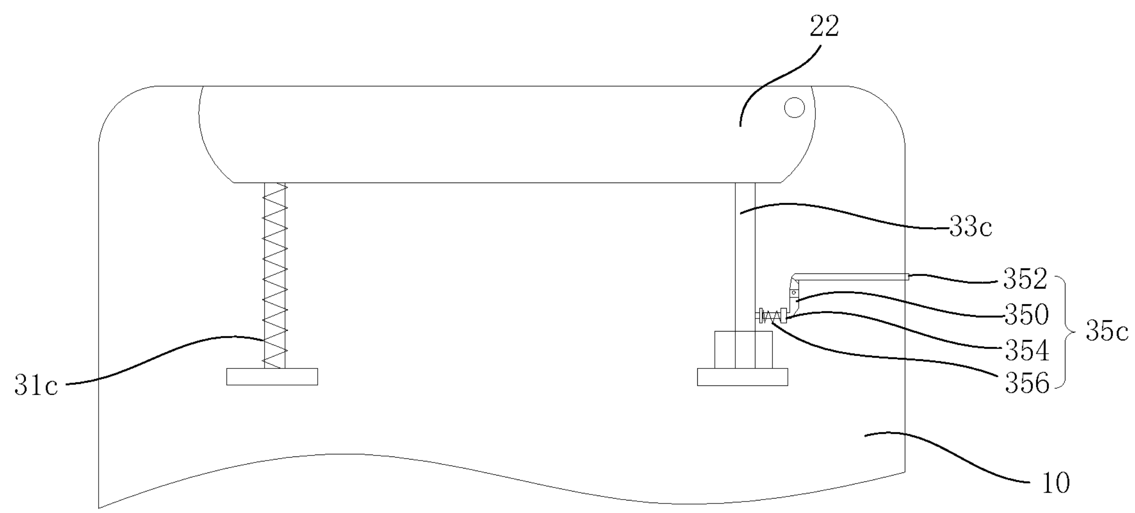
FIG. 45 is a schematic view illustrating a driving mechanism and a swinging member according to another embodiment of the present disclosure.

For example, FIG. 45 illustrates a driving mechanism including an elastic element **31*c*, which may be elastically abut against the body 10 and the swinging member 22, a guide rack 33*c* provided on the swinging member 22 along a predefined direction, and a positioning mechanism 35*c*. The positioning mechanism 35*c* may include a rotation element 350, a pressing element 352, a positioning block 354, and a second elastic element 356. The rotation element 350 may be rotatably connected to the body 10. The pressing element 352 may be rotatably connected to an end of the rotation element 350. The positioning block 354 may be rotatably connected to another end of the rotation element 350 away from the pressing element 352. The second elastic element 356 may be connected to the positioning block 354 to rest the positioning block 354**.

The positioning block 354 may be arranged to limit the position of the guide rack **33*c*. An end of the pressing element 352 away from the rotation element 350 may extend to the outside of the body 10. When the end of the pressing element 352, which extends to the outside of the body 10, is pressed, the rotation element 350 may be driven to rotate, and the rotation element 350 may drive the positioning block 354 to be released from positioning the guide rack 33*c***.

When the swinging member 22 is at the first position, the first elastic element **31*c* may be pressed to deform, and the positioning mechanism 35*c* may limit the guide rack 33*c* to a first predefined position, such that the first elastic element 31*c* may remain as being pressed and deformed. When the swinging member 22 needs to rotate to the outside, the pressing element 352 may be pressed to drive the rotation element 350 to rotate, such that the rotation element 350 may drive the positioning block 354 to be released from limiting the guide rack 33*c*, the first elastic element 31*c* may be restored to extend to drive the swinging member 22 to protrude out of the body 10. At the same time, the guide rack 33***c* may slide to the outside of the body 10. When the guide rack 33*c* slides to a second predefined position, the swinging member 22 may reach the second position, and the positioning block 354 may limit the guide rack 33*c* to prevent the guide rack 33*c* from sliding, such that the first elastic element 31*c* may be ceased to extend outwards, and the swinging member 22 may be prevented from rotating. When the swinging member 22 needs to rotate to the first position, the swinging member 22 may be pressed to rotate to the inside of the body 10, at this point, the first elastic element 31*c* may be extruded. Also, the guide rack 33*c* may slide to the inside of the body 10. When the guide rack 33*c* slides to reach the first predefined position, the positioning block 354 may limit the position of the guide rack 33*c*, such that the guide rack 33*c* may be prevented from sliding, and the swinging member 22 may be limited to the first position.

It may be understood that the driving mechanism may be provided to be other mechanisms, which may not be limited herein.

The processor 40 may be arranged on the main board 80 and connected to the driving mechanism 30. The processor 40 may be configured to receive instructions from a user, so as to control the driving mechanism 30 to drive the functional assembly 20 to rotate.

In some other embodiments, an electronic device may include a body 10, a functional assembly 20 and a sliding mechanism. The functional assembly 20 and the sliding mechanism may be arranged inside the body 10. To be specific, the body 10 may include an input assembly, such as a display screen 16 with a function of touch control. The functional assembly 20 may be rotatably connected to the body 10. The functional assembly 20 may, responsive to an input signal received by the input assembly, rotate between a first position and a second position. The sliding mechanism may be arranged inside the body 10 and include a sliding rail 100 arranged on any one of the body 10 and the functional assembly 20, and a sliding element 200. The sliding element 200 may be configured to slide inside and along the sliding rail 100, such that the functional assembly 20 may rotate to the outside of the receiving cavity 50 or to the inside of the receiving cavity 50.

In some other embodiments, the electronic device may include a body 10, a functional assembly 20 and a sliding mechanism. The functional assembly 20 and the sliding mechanism may be arranged inside the body 10. To be specific, the body 10 may include an input assembly, such as a display screen 16 with a function of touch control. The functional assembly 20 may be rotatably connected to the body 10. The functional assembly 20 may, responsive to an input signal received by the input assembly, rotate between a first position and a second position. The sliding mechanism may be arranged inside the body 10 and include a sliding rail 100 arranged on any one of the body 10 and the functional assembly 20, and a sliding element 200. The sliding element 200 may be configured to slide inside and along the sliding rail 100. When the functional assembly 20 is at the first position, the sliding element 200 may abut against an end of the sliding rail 100; and, when the functional assembly 20 is at the second position, the sliding element 200 may abut against another end of the sliding rail 100.

In still other embodiments, the electronic device may include a shell, a display screen 16, a functional assembly 20, and a sliding element. The shell may include a rear cover 12 and a middle frame 14. The display screen 16 may be connected to the shell and define a receiving cavity 50 with the shell. The display screen 16 may be configured to receive an input signal. The functional assembly 20 may be received inside the shell, and rotate to the inside of the receiving cavity 50 or to the outside of the receiving cavity 50 in response to the input signal. The sliding element may be a sliding block 200 arranged inside the receiving cavity 50. The sliding block 200 may be configured to slide with respect to the shell and the functional assembly 20 to define an arced trajectory, and limit a position of the functional assembly 20 when the functional assembly 20 is arranged inside the receiving cavity 50 or outside the receiving cavity 50.

In some embodiments, the electronic device may include a body 10 and a functional assembly 20 connected to the body 10. The body 10 may include an input assembly, such as a display screen 16 with a function of touch control. The functional assembly 20 may, responsive to an input signal received by the input assembly, rotate in a first direction and a second direction from a first position to a second position.

When the functional assembly 20 is at the first position, the functional assembly 20 may be entirely received in the body 10. When the functional assembly 20 is at the second position, at least a part of the functional assembly 20 may be at an outside of the body 10. One of the first direction and the second direction may be a clockwise direction, and the other one may be an anti-clockwise direction.

In some other embodiments, the electronic device may include a shell, a display screen 16 and a functional assembly 20. The display screen 16 and the functional assembly 20 may be connected to the shell. The shell may include a rear cover 12 and a middle frame 14 connected to the rear cover 12. The display screen 16 may be engaged with the shell to define a receiving cavity 50 and configured to receive input signals. The functional assembly 20 may be rotatably connected to the shell, and configured to rotate in response to the input signal in a first direction and a second direction from an inside of the receiving cavity 50 to an outside of the receiving cavity 50, or rotate in the second direction and the first direction from the outside of the receiving cavity 50 to the inside of the receiving cavity 50.

In still some embodiments, the electronic device may include a shell, a display screen 16 and a functional assembly 20. The display screen 16 and the functional assembly 20 may be connected to the shell. The shell may include a rear cover 12 and a middle frame 14 connected to the rear cover 12. The display screen 16 may be engaged with the shell to define a receiving cavity 50 and configured to receive input signals. The functional assembly 20 may be received inside the shell, and configured to rotate in response to the input signal in a first direction and a second direction with respect to the shell to an outside of the shell. One of the first direction and the second direction may be a clockwise direction, and the other one may be an anti-clockwise direction.

In some embodiments, the electronic device may include a body 10, a functional assembly 20 rotatably connected to the body 10, a driving mechanism 30, and a processor 40. The driving mechanism 30 may be configured to drive the functional assembly 20 to rotate, such that the functional assembly 20 could rotate in a first direction and a second direction from an inside of the body 10 to an outside of the body 10, or rotate in the second direction and the first direction from the outside of the body 10 to be received to the inside of the body 10. The processor 40 may be configured to receive a control instruction to control the driving mechanism 30 to drive the functional assembly 20 to rotate.

In some embodiments, the electronic device may further include a touch screen 16, and the control instruction may be a touch operation received by the touch screen 16. The touch operation received by the touch screen 16 may include at least one of a slide, a click, and a long press.

In other embodiments, the electronic device may include an operational key, and the control instruction may be a triggering instruction of the operational key.

To be specific, the control instructions may include at least one of an image capturing request instruction, a flash turn-on request instruction, and a loudspeaker turn-on request instruction.

Figure 46:
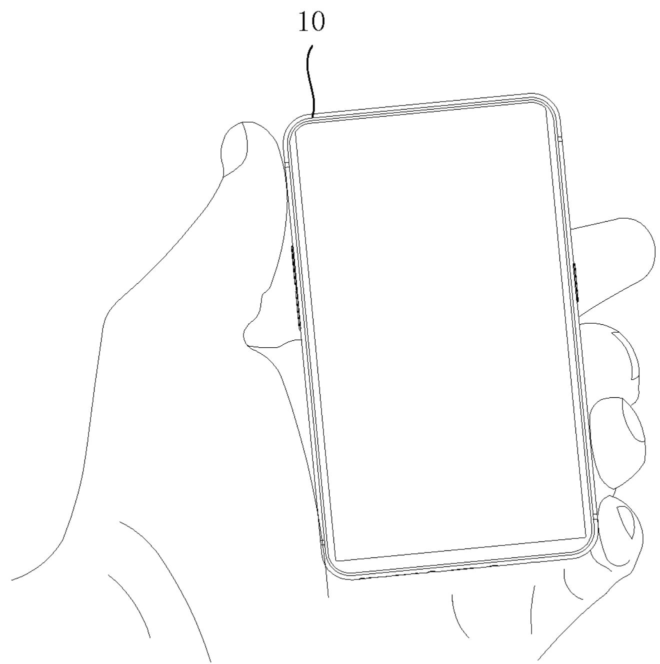
FIG. 46 is a schematic view illustrating an electronic device in use according to an embodiment of the present disclosure, wherein a functional assembly is received in the receiving cavity.
Figure 47:
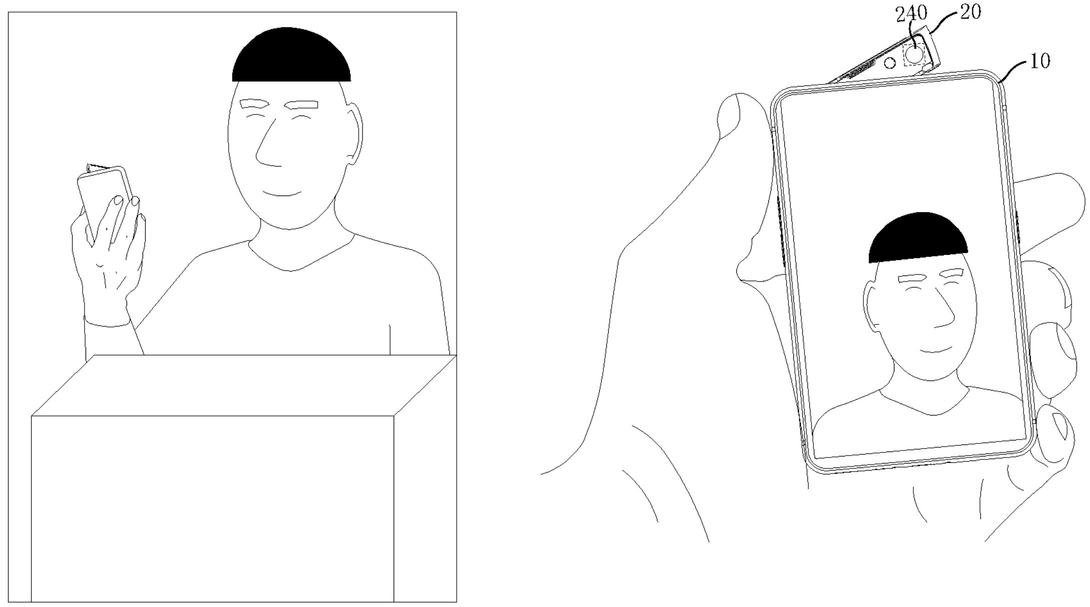
FIG. 47 is a schematic view illustrating an electronic device in use according to another embodiment of the present disclosure, wherein the functional assembly is out of the receiving cavity.

To be an example, as shown in FIG. 46, the functional assembly 20 may be arranged inside the body 10. When a user click a photo taking icon on the touch screen, the processor 40 may receive an instruction of an image collection request, and then control the driving mechanism 30 to drive the functional assembly 20 to rotate to the outside of the body 10, such that the camera module 240 may rotate to the outside of the body 10, as shown in FIG. 47, and a photo taking function may be initiated.

In condition that the user sets to unlock the screen by facial recognition, when the user press the operational key to unlock the screen, the processor 40 may receive the instruction of an image collection request. The processor 40 may control the driving mechanism 30 to drive the functional assembly 20 to rotate to the outside of the body 10, such that the camera module 240 may be initiated to collect an image and send the collected image to the processor 40 for recognition.

When there is an incoming call, the user may slide or click on the touch screen to indicate answering the call, and the processor 40 may receive the instruction of a loudspeaker turn-on request to control the driving mechanism 30 to drive the functional assembly to rotate, such that the receiver may rotate to the outside of the body 10, and the receiver function may be initiated to answer the call.

The above description may only be implementations of the present disclosure, but may not limit the scope of the present disclosure. Any equivalent structural and process transformation based on contents of the present specification and the accompanying figures, and any direct or indirect application of the present disclosure in other related art should be within the scope of the present disclosure.

What is claimed is:

1. An electronic device, comprising:
- a body, defining a receiving cavity; and
- a functional assembly, rotatably connected to the body; and
- a sliding mechanism, arranged in the body, comprising:
  - a sliding rail, arranged on one of the body and the functional assembly; and
  - a sliding element, arranged on the other of the body and the functional assembly and slidable along the sliding rail, such that the functional assembly is able to rotate from an inside of the receiving cavity to an outside of the receiving cavity or rotate from the outside of the receiving cavity to the inside of the receiving cavity,
  - wherein when the sliding element slides along the sliding rail, the sliding element is displaced relative to the sliding rail.

2. The electronic device according to claim 1, wherein the functional assembly comprises:
- a swinging member, rotatably arranged on the body, wherein the sliding element or the sliding rail is arranged on the swinging member; and
- a functional component arranged on the swinging member.

3. The electronic device according to claim 2, further comprising a rotation shaft fixed on the swinging member or the body; wherein the functional assembly is connected to the body through the rotation shaft; the sliding rail is in shape of an arc, and a center of the arc lies on an axle center of the rotation shaft.

4. The electronic device according to claim 3, wherein the swinging member comprises a first end portion, a second end portion disposed oppositely to the first end portion, and a connection portion connected between the first end portion and the second end portion;
- the rotation shaft is arranged on the connection portion and spaced apart from the sliding element or the sliding rail, and the functional component is arranged between the first end portion and the rotation shaft; a distance between the rotation shaft and the first end portion is greater than a distance between the rotation shaft and the second end portion; or
- the rotation shaft is arranged at the second end portion, and the functional component is arranged between the first end portion and the second end portion.

5. The electronic device according to claim 1, wherein the number of the sliding mechanisms is two or more; and sliding rails of the two or more sliding mechanisms are in shape of arcs, and centers of the arcs in which the sliding rails are located are coincident with each other.

6. The electronic device according to claim 1, further comprising a pushrod configured to push the functional assembly to rotate;
- wherein a guide track is arranged on one of the pushrod and the functional assembly, and a guiding element is arranged on the other one of the pushrod and the functional assembly; and the guiding element is arranged in the guide track and slidable along the guide track when the functional assembly is rotating.

7. The electronic device according to claim 1, wherein the functional assembly has a first position at which the functional assembly is positioned inside the receiving cavity and a second position at which the functional assembly is positioned outside the receiving cavity;
- wherein the sliding element is capable of displacing from a first end of the sliding rail to a second end of the sliding rail opposite to the first end; and
- wherein when the functional assembly is located at the first position, the sliding element abuts against a side wall at the first end of the sliding rail; and when the functional assembly is located at the second position, the sliding element abuts against a side wall at the second end of the sliding rail.

8. The electronic device according to claim 2, wherein the body comprises a rear cover, a middle frame connected to the rear cover, and a display screen arranged to cover the rear cover; and
- the middle frame comprises a first side frame, a second side frame disposed oppositely to the first side frame, a third side frame, and a fourth side frame disposed oppositely to the third side frame; wherein the third side frame and the fourth side frame are connected to the first side frame and the second side frame respectively;
- wherein any one of the first, second, third, and fourth side frames defines an opening; the opening communicates with the receiving cavity, and the functional assembly is able to rotate to the outside of the receiving cavity through the opening.

9. The electronic device according to claim 8, wherein the first side frame defines the opening;

the first side frame is divided into two sub-frames by the opening; or the first side frame is disconnected from the second side frame or the third side frame adjacent to the first side frame by the opening.

10. The electronic device according to claim 2, wherein the body comprises a rear cover, a middle frame connected to the rear cover, and a display screen arranged to cover the rear cover; the middle frame comprises a first side frame, a second side frame disposed oppositely to the first side frame, a third side frame, and a fourth side frame disposed oppositely to the third side frame; the third side frame and the fourth side frame are connected to the first side frame and the second side frame respectively; and the first side frame is disconnected from the third side frame at an intersection between the first side frame and the third side frame, such that a length of the first side frame is less than a length of an edge of the display screen corresponding to the first side frame and less than a length of an edge of the rear cover corresponding to the first side frame, and a length of the third side frame is less than a length of an edge of the display screen corresponding to the third side frame and less than a length of an edge of the rear cover corresponding to the third side frame; a length of the second side frame is substantially equal to a length of an edge of the display screen corresponding to the second side frame and substantially equal to a length of an edge of the rear cover corresponding to the second side frame; a length of the fourth side frame is substantially equal to a length of an edge of the display screen corresponding to the fourth side frame and substantially equal to a length of an edge of the rear cover corresponding to the fourth side frame; the first side frame, the third side frame, the display screen, and the rear cover cooperatively define an opening;

wherein the opening communicates with the receiving cavity, and the functional assembly is able to rotate to the outside of the receiving cavity through the opening.

11. The electronic device according to claim 10, wherein the functional component is able to rotate to the outside of the receiving cavity from at least one of the first side frame and the third side frame.

12. The electronic device according to claim 2, wherein the body comprises a rear cover, a middle frame connected to the rear cover, and a display screen arranged to cover the rear cover; the middle frame comprises a first side frame, a second side frame disposed oppositely to the first side frame, and a third side frame connected to the first side frame and the second side frame;

a length of the first side frame is less than a length of an edge of the display screen corresponding to the first side frame and less than a length of an edge of the rear cover corresponding to the first side frame, and a length of the second side frame is less than a length of an edge of the display screen corresponding to the second side frame and less than a length of an edge of the rear cover corresponding to the second side frame, such that the first side frame is disconnected from the second side frame; a length of the third side frame is substantially equal to a length of an edge of the display screen corresponding to the third side frame and substantially equal to a length of an edge of the rear cover corresponding to the third side frame, such that the display screen, the rear cover, an end face at one end of the first side frame that is disconnected from the third side frame, and an end face at one end of the second side frame that is disconnected from the third side frame cooperatively define an opening; and the opening communicates with the receiving cavity, and the functional component is able to rotate to the outside of the receiving cavity through the opening.

13. The electronic device according to claim 2, wherein the body comprises a rear cover, a middle frame connected to the rear cover, and a display screen arranged to cover the rear cover; the rear cover comprises a first sub-cover and a second sub-cover; the first sub-cover is fixed with the functional assembly, and the middle frame is connected between the display screen and the second sub-cover to cooperatively define an opening; and when the functional assembly is entirely received in the receiving cavity, the first sub-cover is arranged to cover the opening and spliced with the second sub-cover.

14. The electronic device according to claim 2, wherein the body comprises a rear cover, a middle frame connected to the rear cover, and a display screen arranged to cover the rear cover; the display screen is rectangular and comprises four first side faces connected to each other in an end-to-end manner; and the functional component comprises a camera module, wherein the camera module comprises:

a bottom face, in shape of a rectangle and fixed on the swinging member; and four second side faces, wherein each of the four second side faces is connected to a corresponding edge of the bottom face and substantially perpendicular to the bottom face;

wherein the bottom face of the camera module is fixed on a side of the swinging member that is close to the display screen; when the functional assembly is received in the receiving cavity, each of the second side faces of the camera module is tilted to a corresponding first side face of the display screen; and when the functional assembly rotates to the outside of the receiving cavity, the camera module is located at the outside of the receiving cavity, and at least one of the second side faces of the camera module is substantially parallel to at least one first side face of the display screen.

15. The electronic device according to claim 14, wherein the functional component further comprises a receiver arranged on the side of the swinging member that is close to the display screen, wherein the camera module and the receiver are arranged on a same side of a rotational axis of the functional assembly, and the receiver is disposed closer to the rotational axis than the camera module.

16. The electronic device according to claim 15, further comprising:

a front flash, wherein the front flash is arranged on the side of the swinging member that is close to the display screen and disposed closer to the camera module than the rotational axis and the receiver; and a rear flash, wherein the rear flash is arranged on the side of the swinging member that is close to the display screen and symmetric with the front flash, and the front flash and the rear flash are connected to a same flexible printed circuit board.

17. The electronic device according to claim 14, wherein the display screen defines a display region; and when the functional assembly is received in the receiving cavity, at least a part of the functional assembly is covered by the display region.

18. The electronic device according to claim 1, wherein the number of the functional assemblies is two or more, and rotational axes of the two or more functional assemblies are coincident with each other.

19. An electronic device, comprising:

a shell;

a display screen, connected to the shell and configured to receive an input signal; wherein the display screen and the shell cooperatively define a receiving cavity;

a functional assembly, received in the receiving cavity and able to rotate from an outside of the receiving cavity to an inside of the receiving cavity or from the inside of the receiving cavity to the outside of the receiving cavity in response to the input signal; and a sliding element, received in the receiving cavity, slidable in an arc-shaped trajectory with respect to the shell and the functional assembly, and configured to limit a position of the functional assembly when the functional assembly is positioned inside the receiving cavity or outside the receiving cavity, wherein when the sliding element slides along the arc-shaped trajectory, the sliding element is displaced relative to the arc-shaped trajectory.

20. An electronic device, comprising:

a body portion;

a functional assembly, rotatably connected to the body portion;

a sliding mechanism, arranged inside the body portion and comprising:

a sliding rail, arranged on one of the body and the functional assembly; and a sliding element, arranged on the other of the body and the functional assembly and slidable along the sliding rail, wherein when the sliding element slides along the sliding rail, the sliding element is displaced relative to the sliding rail;

a driving mechanism, configured to drive the functional assembly to rotate, such that the functional assembly is able to rotate from an inside of the body portion to an outside of the body portion or from the outside of the body portion to the inside of the body portion; and a processor, configured to receive a control instruction to control the driving mechanism to drive the functional assembly to rotate.

* * * * *